US008537740B2

(12) United States Patent
Markel et al.

(10) Patent No.: US 8,537,740 B2
(45) Date of Patent: Sep. 17, 2013

(54) MOBILE COMMUNICATION DEVICE AND SYSTEM SUPPORTING MEDIA FLOW CONTROL

(75) Inventors: Shlomo Markel, Haifa (IL); Michael Civiello, Scottsdale, AZ (US)

(73) Assignee: Broadcom Corporation, Irvine, CA (US)

( * ) Notice: Subject to any disclaimer, the term of this patent is extended or adjusted under 35 U.S.C. 154(b) by 1231 days.

(21) Appl. No.: 11/112,099

(22) Filed: Apr. 22, 2005

(65) Prior Publication Data

US 2006/0126544 A1    Jun. 15, 2006

Related U.S. Application Data

(60) Provisional application No. 60/635,124, filed on Dec. 10, 2004.

(51) Int. Cl.
*H04W 4/00* (2009.01)
*H04M 3/42* (2006.01)

(52) U.S. Cl.
USPC .................................. 370/328; 455/414.1

(58) Field of Classification Search
USPC ............ 455/414.4, 414.1; 725/135, 62, 725/135.62; 709/231; 370/310, 328, 259–271
See application file for complete search history.

(56) References Cited

U.S. PATENT DOCUMENTS

| | | | |
|---|---|---|---|
| 5,774,186 A | 6/1998 | Brodsky et al. | |
| 5,892,915 A * | 4/1999 | Duso et al. | 709/219 |
| 2001/0038690 A1 | 11/2001 | Palmer et al. | |
| 2002/0090195 A1 | 7/2002 | Tada | |
| 2002/0137531 A1 * | 9/2002 | Jeschke | 455/466 |
| 2003/0023690 A1 | 1/2003 | Lohtia | |
| 2003/0037068 A1 * | 2/2003 | Thomas et al. | 707/200 |
| 2003/0041331 A1 | 2/2003 | Allen et al. | |
| 2003/0097659 A1 | 5/2003 | Goldman | |
| 2003/0162519 A1 | 8/2003 | Smith et al. | |

(Continued)

FOREIGN PATENT DOCUMENTS

| | | |
|---|---|---|
| CN | 1325250 | 12/2001 |
| CN | 1363184 | 8/2002 |
| EP | 1 398 947 | 3/2004 |

OTHER PUBLICATIONS

Chinese Office action corresponding to Chinese application No. 2005101310805, issued Mar. 28, 2008, 8 pages.

(Continued)

*Primary Examiner* — Lester Kincaid
*Assistant Examiner* — Daniel Lai
(74) *Attorney, Agent, or Firm* — Garlick & Markison; Edward J. Marshall

(57) ABSTRACT

A system and method for presenting information to a user of a mobile communication device. Various aspects of the present invention may comprise receiving a first portion of media information from a remote media information source and presenting the first portion to a user. While presenting the first portion to the user, a first signal may be received. In response to the first signal, a control signal may be transmitted to the remote media information source to cause the remote media information source to stop transmitting the media information. A second signal may be received, and in response to the second signal, a second control signal may be transmitted to the remote media information source to cause the remote media information source to resume transmitting the media information. A second portion of the media information may then be received from the remote media information source and presented to the user.

31 Claims, 6 Drawing Sheets

(56) References Cited

U.S. PATENT DOCUMENTS

| | | | |
|---|---|---|---|
| 2003/0236907 A1* | 12/2003 | Stewart et al. | 709/231 |
| 2004/0214555 A1* | 10/2004 | Kumar et al. | 455/414.1 |
| 2005/0183120 A1* | 8/2005 | Jain et al. | 725/46 |
| 2005/0213530 A1* | 9/2005 | Kuure et al. | 370/328 |
| 2005/0245240 A1* | 11/2005 | Balasuriya et al. | 455/414.1 |

OTHER PUBLICATIONS

European Search Report corresponding to European Patent Application No. 05018589.1-1522 dated Jul. 14, 2010.

EPO Communication dated Nov. 16, 2010 in Application 05 018 588.3-1522.

* cited by examiner

MOBILE COMMUNICATION DEVICE AND SYSTEM SUPPORTING MEDIA FLOW CONTROL

CROSS-REFERENCE TO RELATED APPLICATIONS/INCORPORATION BY REFERENCE

This patent application is related to and claims priority from provisional patent application Ser. No. 60/635,124, filed Dec. 10, 2004, and titled "MOBILE COMMUNICATION DEVICE AND SYSTEM SUPPORTING PVR FUNCTIONALITY," the contents of which are hereby incorporated herein by reference in their entirety. This patent application is related to U.S. patent application Ser. No. 11/112,631, filed concurrently herewith, entitled "MOBILE COMMUNICATION DEVICE AND SYSTEM SUPPORTING PERSONAL MEDIA RECORDER FUNCTIONALITY", the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A user utilizing a mobile (or portable) communication device for consuming media information (e.g., viewing and/or listening to media information) may often be interrupted. Also a user utilizing a mobile communication device for consuming media information may desire to temporarily utilize the mobile communication device for other functionality (e.g., other communications, game playing, time management, document processing, etc.) provided to the user by the mobile communication device. Such other functionality may, for example, be unrelated to the media information presently being consumed. Such an interruption, for example when a user is consuming information communicated to the mobile communication device in real-time, may result in a user missing media information communicated during the interruption.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for presenting media information to a user of a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
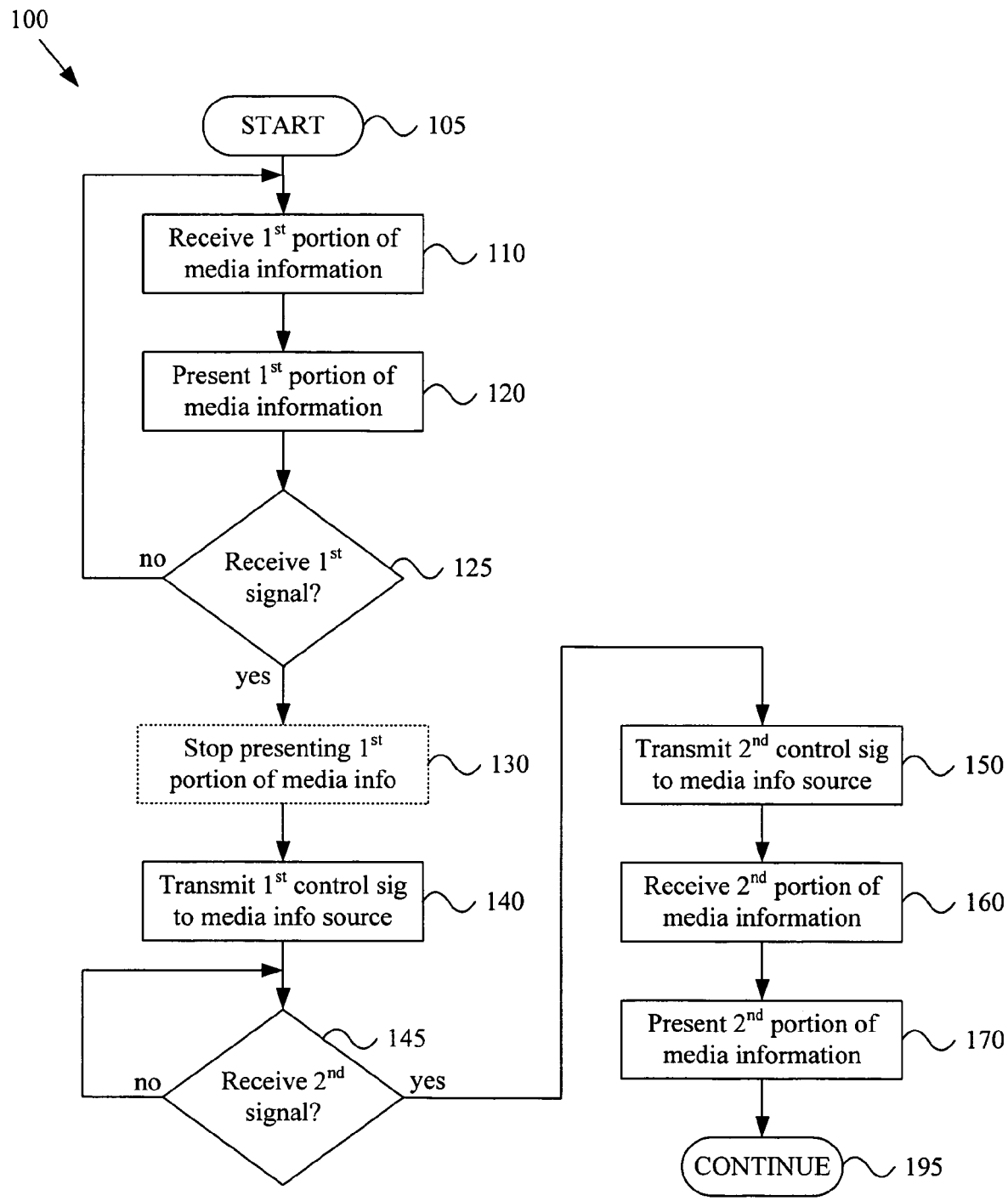
FIG. 1 is a diagram illustrating a method for presenting media information to a user of a mobile communication device, in accordance with various aspects of the present invention.

FIG. 1 is a diagram illustrating a method 100 for presenting media information to a user of a mobile communication device, in accordance with various aspects of the present invention. The media information may comprise characteristics of any of a variety of types of information. For example and without limitation, the media information may comprise multi-media, video, audio, textual, graphical, pictorial and other known types of information. For example, the media information may comprise movie, television program, sporting event, gaming or music information. The term "media information" will be used in the following discussion to generally refer to any or all of such types of information. Additionally, the term "consume," when applied to a user consuming media information may generally apply to any of viewing, listening, reading, feeling or any other known manner in which a user takes in, perceives, processes or comprehends information.

The mobile communication device may comprise characteristics of any of a variety of mobile communication devices. For example and without limitation, the mobile communication device may comprise characteristics of a two-way communication device (e.g., a cellular telephone, mobile e-mail device, two-way pager, pocket computer with media communication and two-way communication capability, etc.). The scope of various aspects of the present invention should not be limited by characteristics of a particular type of mobile communication device.

The exemplary method 100 may begin at step 105. The method 100 (and other methods discussed herein) may begin for any of variety of reasons. For example and without limitation, the method 100 may begin in response to an explicit user command to begin. Also for example, the method 100 may begin upon resetting or powering up the mobile communication device. Further for example, the method 100 may begin in response to a signal received from another communication system. Accordingly, the scope of various aspects of the present invention should not be limited by characteristics of any particular initiating causes or conditions.

The exemplary method 100 may, at step 110, comprise receiving a first portion of media information (e.g., a first portion of a unit of media information) from a media information source (e.g., a remote media information source). A "unit of media information" may, for example and without limitation, comprise characteristics of a television program, a song, a slideshow, a movie, a music video, a televised sporting event, an audio newscast, a stock ticker, etc. Step 110 may comprise receiving the media information in any of a variety of manners (e.g., receiving media broadcast, multicast, unicast, streaming, etc.).

Step 110 may comprise receiving the media information from any of a variety of media information sources. For example and without limitation, step 110 may comprise receiving the media information from a remote media information source, such as, for example, a communication network head-end, a cellular communication central facility or base transceiver subsystem, a satellite communication network, a neighborhood media information source, a home-based information source in another room, etc.

Step 110 may comprise receiving the media information over any of a variety of communication media and utilizing any of a variety of communication protocols. For example and without limitation, step 110 may comprise receiving the media information over a wireless RF medium and utilizing a cellular telephony communication protocol. Also, for example, step 110 may comprise receiving the media information through a wired, tethered optical or non-tethered optical medium, and utilizing any of a large variety of wired, wireless or optical communication protocols that are presently known or to be developed. In general, step 110 may comprise receiving a first portion of media information (e.g., a first portion of a unit of media information). Accordingly, the scope of various aspects of the present invention should not be limited by characteristics of any particular manner of receiving media information.

The exemplary method may, at step 120, comprise presenting the first portion of the media information (e.g., the first portion of the unit of media information) to a user (e.g., in a human-perceivable form). Step 120 may comprise presenting the first portion of the media information to a user in any of a variety of manners. For example and without limitation, step 120 may comprise presenting the first portion of the media information to a user with a user interface module of the mobile communication device (e.g., a video display, speaker, etc.). Step 120 may, for example, comprise providing the user with various mechanisms (e.g., various display and audio control mechanisms) for controlling the presentation of the first portion of the media information to the user. In general, step 120 may comprise presenting the first portion of the media information (e.g., the first portion of the unit of media information) to a user. Accordingly, the scope of various aspects of the present invention should not be limited by any particular manner of presenting media information to a user.

The exemplary method 100 may, for example, comprise receiving (e.g., at step 110) and presenting (e.g., at step 120) the first portion of the media information until a first signal is received. For example, the method 100 may, at step 125, control execution flow of the method 100 depending on whether such a first signal is received. In an exemplary scenario where the first signal has not yet been received, step 125 may direct execution flow of the method 100 back up to steps 110 and 120 for continued reception and presentation of the first portion of the media information. In another exemplary scenario where the first signal has been received, step 125 may direct execution flow of the method 100 to step 130, which will be discussed below.

The first signal may, for example, be representative of a user input to the mobile communication device. For example and without limitation, the first signal may result from a user input indicative of the user desiring to respond to (or service) an incoming communication or generate an initial outgoing communication. Also for example, the first signal may result from a user input indicative of the user desiring to change the manner in which a unit of media information is being presented to the user by the mobile communication device. For example, the first signal may be indicative of the user desiring to (at least temporarily) pause presentation of media information. The first signal may also, for example, correspond to a signal originated by the mobile communication device. For example, the signal may correspond to an internally generated alarm or other user notification.

In a non-limiting exemplary scenario, the mobile communication device may be presenting media information to a user (e.g., at step 120) when an incoming communication arrives at the mobile communication device (e.g., a cellular phone call). Continuing the exemplary scenario, step 125 (or another step) may comprise providing the user with an indication of the incoming communication and provide the user with options for responding to the incoming communication. For example, the exemplary method 100 may comprise notifying the user of the incoming communication by providing a visible, audible and/or tactile indication. The user may then, for example, provide input to the mobile communication device to direct the mobile communication device in handling the incoming communication. For example, the user may provide an input directing the mobile communication device to ignore the incoming communication, direct the incoming communication to a messaging function, or answer the incoming communication. A user input directing the mobile communication device to answer the incoming communication provides a non-limiting example of a first signal that step 125 may be waiting for.

Alternatively, for example, the first signal may originate at another communication system (or be indicative of a signal originating at another communication system). For example and without limitation, the first signal may originate at a remote communication system that is attempting to communicate with the mobile communication device (e.g., with the user). For example, in this scenario, the first signal may comprise a signal indicative of an incoming telephone call, videophone call, instant text message or email message.

Note that such a remote communication system may be the same communication system that is communicating the media information to the mobile communication device or may be independent. In a non-limiting exemplary scenario, the mobile communication device may, for example at step 110, receive a first portion of a unit of media information from a cellular telephone communication system and may, at step 125, receive a first signal from the cellular telephone communication system, where the first signal is indicative of an incoming telephone call for the mobile communication system.

In general, the first signal may comprise any of a variety of signal characteristics and may originate at any of a variety of sources. Accordingly, the scope of various aspects of the present invention should not be limited by characteristics of any particular signal.

The exemplary method 100 may, at step 130, comprise ceasing (or stopping) presentation of the first portion of the media information (e.g., the first portion of the unit of media information). As mentioned previously, in response to receiving the first signal, step 125 may direct execution flow of the exemplary method 100 to step 130. Step 130 may, for example, comprise stopping presentation of the first portion of the media information in any of a variety of manners, which may depend on the type of media information being presented. For example and without limitation, step 130 may comprise blanking a video output screen or presenting a display-saver image, silencing an audio output speaker, freezing an image on a video output screen, etc.

Also for example, step 130 may comprise outputting a user interface indication on a video output screen that is related to the received first signal. As a non-limiting example, step 130 may comprise presenting the user with options concerning how to handle an incoming communication. As another non-limiting example, step 130 may comprise presenting the user with options concerning how to resume presentation of the media information. As still another non-limiting example, step 130 may comprise presenting the user with options for executing any of a variety of functions provided by the mobile communication device.

As will be discussed in more detail below, step 140 may comprise transmitting a first control signal to the media information source, where the first control signal may be adapted to cause the media information source to stop communicating the media information to the mobile communication device. In such a scenario, for example where there may be significant latency between transmitting the first control signal and stopping communication of the media information at the media information source, step 130 may comprise stopping the presentation of the first portion of media information while media information is still arriving (e.g., either ignoring the arriving media information or buffering the arriving media information for later presentation). Also, for example in an exemplary scenario where the latency period is relatively small, step 130 may comprise stopping the presentation of the first portion of media information when the media information stops arriving from the media information source. Accordingly, in the exemplary method 100 illustrated in FIG. 1, step 130 may occur prior to step 140, concurrently with step 140, or after step 140, depending on the particular implementation and/or media information communication environment.

In general, step 130 may comprise ceasing presentation of the first portion of the media information. Accordingly, the scope of various aspects of the present invention should not be limited by characteristics of any particular manner of ceasing such presentation or by characteristics of any additional related user interface functionality that may be performed.

The exemplary method 100 may, at step 140, comprise transmitting a first control signal to the media information source (e.g., the remote media information source), where the first control signal is adapted to cause the media information source to stop transmitting the media information (e.g., the unit of media information). Step 140 may comprise transmitting the first control signal to the media information source in any of a variety of manners. For example and without limitation, step 140 may comprise transmitting the first control signal to the media information source over a dedicated reverse communication channel associated with a communication channel over which the media information source is communicating the media information to the mobile communication device. Also for example, step 140 may comprise transmitting the first control signal to the media information source over a reverse communication channel that is shared between multiple mobile communication devices to control their respective media information flows.

Though, in the exemplary method 100 illustrated in FIG. 1 and discussed here, the first control signal transmitted at step 140 is adapted to cause the media information source to stop transmitting the media information, in other alternative non-limiting exemplary scenarios, step 140 may comprise transmitting a first control signal to the media information source, where the first control signal is adapted to cause the media information source to modify the transmission of the media information in any of a number of ways (e.g., transmission rate change, forward or reverse direction, temporal or spatial resolution change, etc.).

In general, exemplary step 140 may comprise transmitting a first control signal to the media information source (e.g., where the first control signal is adapted to cause the media information source to stop transmitting the media information). Accordingly, the scope of various aspects of the present invention should not be limited by characteristics of any particular control signal or characteristics of any particular manner of transmitting a control signal to a media information source.

The exemplary method 100 may, at step 145, comprise waiting for a second signal and then, upon receipt of such a second signal, directing execution flow of the exemplary method 100 to step 150 (which will be discussed below). At exemplary step 145, the exemplary method 100 may comprise the mobile communication device performing any of a large variety of functions. For example and without limitation, while waiting for the second signal, step 145 may comprise performing a second communication (e.g., not related to the first communication involving the media information). For example such a second communication may comprise characteristics of a cellular phone call (audio and/or video), text message communication, email communication, instant messaging, etc. Also for example, while waiting for the second signal, step 145 may comprise performing gaming functionality, word processing or spreadsheet functionality, personal time management functionality, etc. Accordingly, the scope of various aspects of the present invention should not be limited by characteristics of any particular functionality that may be performed while step 145 is waiting for the receipt of the second signal.

The second signal may comprise any of a variety of characteristics. For example and without limitation, the second signal may be representative of a user input indicative of the user ending a communication (e.g., ending a phone call, completing transmission of a message, etc.) or other function (e.g., making a notebook entry, finishing a game, etc.). Also for example, the second signal may result from a user input indicative of the user desiring to change the manner in which a unit of media information is being presented to the user by the mobile communication device. For example, the second signal may be indicative of the user desiring to resume normal presentation of media information, the presentation of which was previously altered (e.g., stopped at step 130).

Alternatively, for example, the second signal may originate at a remote source (e.g., a remote communication system). For example and without limitation, the second signal may originate at a remote communication system that is completing communication with the mobile communication device (e.g., indicating that the remote communication system has completed communicating with the mobile communication device). In general, the second signal may comprise any of a variety of signal characteristics and may originate at any of a variety of sources. Accordingly, the scope of various aspects of the present invention should not be limited by characteristics of any particular signal.

The exemplary method 100 may, at step 150, comprise transmitting a second control signal to the media information source (e.g., the remote media information source). The second control signal may, for example, be adapted to cause the media information source to resume transmitting the media information (e.g., the unit of media information) to the mobile communication device. Step 150 may, for example and without limitation, share various characteristics with exemplary step 140, discussed previously. For example, step 150 may comprise transmitting the second control signal to the media information source in any of a variety of manners.

The second control signal may comprise any of a variety of control signal characteristics. For example and without limitation, the second control signal may comprise characteristics of a predefined command to the media information source to resume the transmission of media information to the mobile communication device. Also for example, the second control signal may comprise information identifying the mobile communication device and/or identifying the media information (e.g., the unit of media information), the transmission of which was stopped as a result of a first control signal (e.g., transmitted at step 140). Further for example, the second control signal may comprise information identifying a particular point in the media information. Such a particular point in the media information may, for example, be representative of where presentation of the media information was previously stopped (e.g., at step 130) or where in the media information a user desires presentation of the media information to resume. Accordingly, the scope of various aspects of the present invention should not be limited by characteristics of any particular control signal.

Though, in the exemplary method 100 illustrated in FIG. 1 and discussed here, the second control signal transmitted at step 150 is adapted to cause the media information source to resume transmitting the media information, in other alternative non-limiting exemplary scenarios, step 150 may comprise transmitting a second control signal to the media information source, where the second control signal is adapted to cause the media information source to modify the transmission of the media information in any of a number of ways (e.g., transmission rate change, forward or reverse direction, temporal or spatial resolution change, etc.).

In general, exemplary step 150 may comprise transmitting a second control signal to the media information source (e.g., where the second control signal is adapted to cause the media information source to resume transmitting the media information). Accordingly, the scope of various aspects of the present invention should not be limited by characteristics of any particular control signal or characteristics of any particular manner of transmitting a control signal to a media information source.

The exemplary method 100 may, at step 160, comprise receiving a second portion of the media information (e.g., a second portion of the unit of media information, the first portion of which was received and presented at steps 110 and 120) from the media information source (e.g., a remote media information source). Step 160 may, for example and without limitation, share various characteristics with exemplary step 10 discussed previously.

For example and without limitation, a second portion of the media information may comprise a second portion of a television program or period of television programming, a song, a slideshow, a movie, a music video, a televised sporting event, an audio newscast, a stock ticker, etc., where the first portion was received at step 110 and presented at step 120. For example, the second portion of the media information may be sequentially adjacent to the first portion (i.e., beginning where the first portion left off). As with step 110, step 160 may comprise receiving the media information in any of a variety of manners (e.g., receiving media broadcast, multicast, unicast, streaming, etc.), which may, for example but not necessarily, comprise the same manner in which the first portion of the media information was received at step 110. Also, step 160 may, for example, comprise receiving the media information over any of a variety of communication media and utilizing any of a variety of communication protocols. In general, step 160 may comprise receiving a second portion of media information (e.g., a second portion of the unit of media information, the first portion of which was received at step 110). Accordingly, the scope of various aspects of the present invention should not be limited by characteristics of any particular manner of receiving media information.

The exemplary method 100 may, at step 170, comprise presenting the second portion of the media information (e.g., a second portion of the unit of media information, the first portion of which was presented at step 120) to the user. Step 170 may, for example and without limitation, share various characteristics with exemplary step 120 discussed previously. Step 170 may comprise presenting the second portion of the media information to the user in any of a variety of manners. For example and without limitation, step 170 may comprise presenting the second portion of the media information in a manner similar to that utilized in step 120 to present the first portion of the media information.

In presenting the second portion of the media information (e.g., a second portion of the unit of media information) to the user, step 170 may, for example, comprise providing media presentation control features to the user at a user interface. For example, step 170 may comprise providing the user the ability to specify presentation of the second portion of the media information in fast-forward mode. In providing such capability, step 170 may comprise providing a user with the capability to initiate transmission of a fast-forward control signal. Such a fast-forward control signal may, for example, be adapted to cause the media information source to communicate the media information to the mobile communication device in a sequentially forward manner and at a faster rate than normal. Step 170 may, for example, comprise providing the user with the capability to initiate the transmitting of various presentation control signals to the media information source (e.g., various trick play control signals).

In a non-limiting exemplary scenario, the media information may correspond to a real-time event (e.g., a live newscast or sporting event). In the exemplary scenario, step 120 may have comprised presenting a first portion of the media information to the user generally as the first portion of the media information was received (e.g., in real-time) at step 110. Continuing the exemplary scenario, step 170 may then comprise presenting the second portion of the media information to the user as the second portion of the information is received at step 160. The second portion of the media information may begin, for example, where the first portion stopped. Note that because of temporal delay in presenting the second portion of the media information, for example caused by steps 130-150, the second portion of the media information may now lag real-time. Accordingly, in the exemplary scenario, step 170 may comprise providing the user the ability to specify fast-forward presentation of the second portion of the media information to catch up to real-time. Alternatively, for example, step 170 may comprise providing the user the ability to skip temporally lagging media information and immediately catch up to real-time.

Further for example, step 170 may comprise providing a rewind (or review) capability to the user. In providing such capability, step 170 may comprise providing a user with the capability to initiate the transmission of a rewind control signal to the media information source. Such a rewind control signal may, for example, be adapted to cause the media information source to communicate the media information to the mobile communication device in a sequentially reversed manner. Alternatively, for example, step 170 may comprise retaining a particular amount of previously presented media information in a media buffer and providing a user interface allowing the user to specify rewinding or reviewing such media information.

As another example of user interface capability, step 170 may comprise providing to the user an indication of the point in the media information that the user is presently consuming the media information. For example and without limitation, step 170 may comprise providing to the user an indication of a percentage of completeness of a unit of media information. Also for example, step 170 may comprise providing to the user an indication of the temporal relationship between media information being presented to the user and corresponding real-time media information. Such an indication may comprise any of a variety of graphical or textual characteristics (e.g., on-screen text information, on-screen scroll bar, menu selection, etc.). Such an indication may also comprise various audible characteristics (e.g., an audible indication that a user has caught up to the real-time information or is temporally lagging).

Note that the above-mentioned user interface examples are merely exemplary and by no means meant to represent a limiting set of user interface characteristics. Accordingly, the scope of various aspects of the present invention should not be limited by characteristics of particular user interface features.

The exemplary method 100 (and other methods presented herein) may, at step 195, comprise performing continued processing. Such continued processing may comprise characteristics of any of a variety of continued processing. For example and without limitation, step 195 may comprise receiving and presenting a third portion of the media information to the user. Step 195 may also, for example, comprise providing media presentation control capability for the third portion similar to that discussed previously with regard to the first and second portions of the media information. Additionally, for example, step 195 may comprise stopping presentation of the second portion of the media information (e.g., in a manner similar to that discussed with regard to steps 130-145), and then presenting a third portion of the media information to the user. Accordingly, the scope of various aspects of the present invention should not be limited by characteristics of any particular continued processing that may be performed.

The previous exemplary method 100 was presented to provide specific illustrations of various generally broader aspects of the present invention. Accordingly, the scope of various aspects of the present invention should not be limited by characteristics of the previously discussed exemplary method 100.

Figure 2:
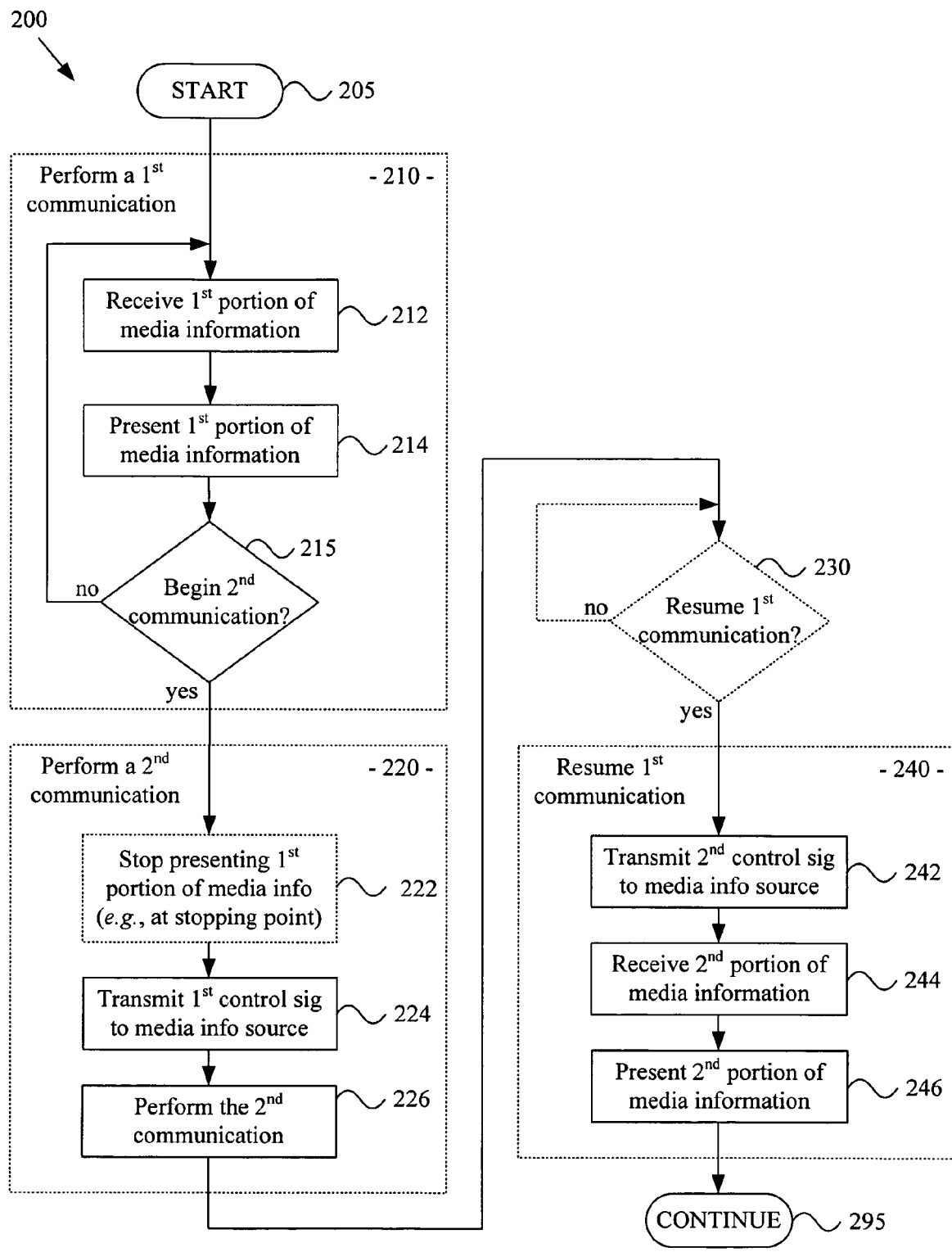
FIG. 2 is a diagram illustrating a method for presenting media information to a user of a mobile communication device, in accordance with various aspects of the present invention.

FIG. 2 is a diagram illustrating a method 200 for presenting media information to a user of a mobile communication device, in accordance with various aspects of the present invention. The exemplary method 200 may, for example and without limitation, share various characteristics with the exemplary method 100 illustrated in FIG. 1 and discussed previously.

The exemplary method 200 may, at step 210, comprise performing a first communication with a media information source (e.g., a remote media information source). The exemplary method 200 may, for example at step 212, comprise receiving a first portion of media information (e.g., a first portion of a unit of media information). The exemplary method 200 may, for example at step 214, comprise presenting the first portion of the media information to a user. The exemplary method 200 may also comprise a flow control step 215, which directs execution flow of the method 200 to receiving and presenting steps 212 and 214 until a second communication is to begin. Exemplary steps 212, 214 and 215 may, for example and without limitation, share various characteristics with exemplary steps 110, 120 and 125, respectively, of the exemplary method 100 illustrated in FIG. 1 and discussed previously.

Exemplary step 215 may, for example, comprise determining to begin a second communication in any of a variety of manners. For example and without limitation, step 215 may comprise receiving a signal indicating that the second communication is to begin. Such a signal may, for example, comprise a signal from a user or a signal from another communication system. For example and without limitation, such a signal may comprise a signal from a user expressing a desire to answer an incoming communication or initiate a new communication. Also for example, such a signal may comprise a signal from another communication system notifying the mobile communication device of an incoming new communication. The scope of various aspects of the present invention should not be limited by characteristics of any particular received signal indicating that a communication is to begin or any particular manner of determining whether a communication is to begin.

In a non-limiting exemplary scenario, the mobile communication device may be performing a first communication at step 210 and presenting media information to a user (e.g., at step 214) when an incoming communication arrives at the mobile communication device (e.g., a cellular phone call). Continuing the exemplary scenario, step 215 (or another step) may comprise providing the user with an indication of the incoming communication and provide the user with options for responding to the incoming communication. For example, the exemplary method 200 may comprise notifying the user of the incoming communication by providing a visible, audible and/or tactile indication. The user may then, for example, provide input to the mobile communication device to direct the mobile communication device in handling the incoming communication. For example the user may provide an input directing the mobile communication device to ignore the incoming communication, direct the incoming communication to a messaging function, or answer the incoming communication. A user input directing the mobile communication device to answer the incoming communication may, for example, initiate the functionality of step 220.

The exemplary method may, at step 220, comprise performing a second communication. The exemplary method 200 may, for example at step 222, comprise stopping presentation of media information (e.g., the first portion of a unit of media information) to the user. The exemplary method 200 may, for example, comprise stopping presentation of the media information at a stopping point of the media information.

The exemplary method 200 may, for example at step 224, comprise stopping the first communication. For example, step 224 may comprise transmitting a first control signal to the media information source, where the first control signal is adapted to cause the media information source to stop the first communication (i.e., the communication communicating the media information to the mobile communication device). For example and without limitation, steps 222 and 224 may share various characteristics with steps 130 and 140 of the exemplary method 100 illustrated in FIG. 1 and discussed previously.

The exemplary method 200 may, at step 226, comprise performing the second communication. The second communication may comprise characteristics of any of a variety of communication types. The second communication may, for example, be entirely independent of the first communication or may be related to the first communication. For example, the second communication may comprise characteristics of a cellular phone call (audio and/or video), text message communication, email communication, instant messaging, etc. Step 226 may, for example, comprise performing the second communication over any of a large variety of communication media, through any of a large variety of communication networks, and using any of a variety of communication protocols. For example, step 226 may comprise communicating with the same communication network communicated with during step 210 or a different communication network. In general, step 226 may comprise performing the second communication. Accordingly, the scope of various aspects of the present invention should not be limited by characteristics of any particular type of communication.

After performing the second communication (e.g., at step 226), the exemplary method 200 may, at step 230, comprise waiting for an indication to resume the first communication. Step 230 may, for example and without limitation, share various characteristics with step 145 of the exemplary method 100 illustrated in FIG. 1 and discussed previously. For example, step 230 may comprise waiting for a second signal indicating that it is time to resume the first communication. As discussed previously with regard to exemplary step 145, such a second signal may comprise any of a variety of characteristics.

Alternatively, the method 200 may bypass step 230 and immediately proceed to resuming the first communication (e.g., at step 240) after performing the second communication at step 226. For example and without limitation, in an exemplary scenario where the second communication performed at step 226 was a cellular phone call, upon completion of the cellular phone call, execution flow of the exemplary method 200 may flow immediately from step 226 to step 240 for immediate resumption of the first communication.

The exemplary method 200 may, at step 240, comprise generally resuming the first communication (e.g., the first communication performed at step 210) and performing various related activities. Resuming the first communication may, for example, comprise resuming communication of the media information from the media information source to the mobile communication device. For example, resuming the first communication may result in the communication of a second portion of the media information (e.g., a second portion of the unit of media information), the first portion of which was received and presented at steps 212 and 214.

The exemplary method 200 may, for example at step 242, comprise resuming the first communication. Step 242 may, for example and without limitation, share various characteristics with step 150 of the exemplary method 100 illustrated in FIG. 1 and discussed previously. Step 242 may, for example, comprise resuming the first communication by, at least in part, transmitting a second control signal to the media information source, where the second control signal is adapted to cause the media information source to resume the first communication. The media information source may then, for example, resume transmitting the media information to the mobile communication device. For example, the media information source may resume transmitting the media information at or near the point at which presentation of the media information was stopped at step 222.

The exemplary method 200 may also, for example at steps 244 and 246, comprise receiving and presenting the second portion of the media information (e.g., a second portion of the unit of media information) to the user of the mobile communication device. Steps 244 and 246 may, for example and without limitation, share various characteristics with steps 160 and 170 of the exemplary method 100 illustrated in FIG. 1 and discussed previously.

The exemplary method 200 may, at step 295, comprise performing continued processing. Such continued processing may comprise characteristics of any of a large variety of continued processing, some examples of which were discussed previously with regard to step 195 of the exemplary method 100 illustrated in FIG. 1.

The previous exemplary method 200 was presented to provide specific illustrations of various generally broader aspects of the present invention. Accordingly, the scope of various aspects of the present invention should not be limited by characteristics of the previously discussed exemplary method 200.

Figure 3:
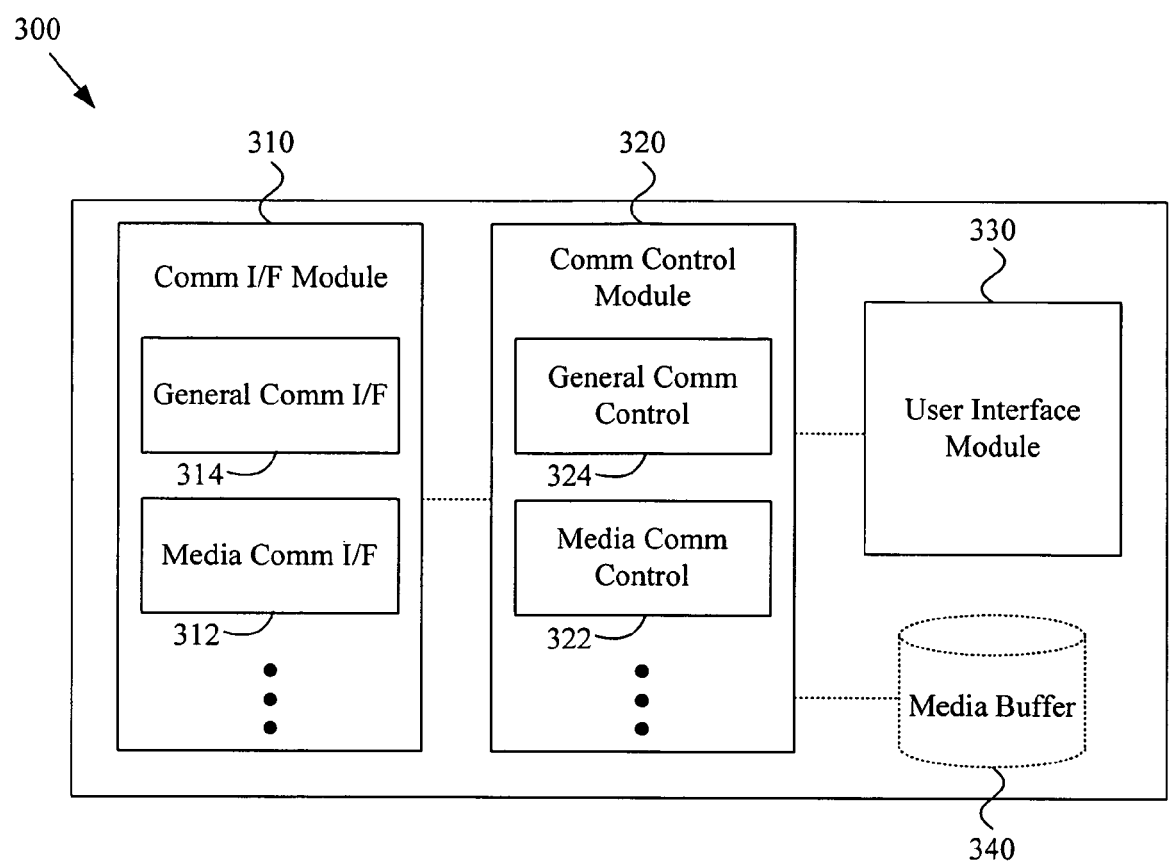
FIG. 3 is a block diagram of a mobile communication device that presents media information to a user of the mobile communication device, in accordance with various aspects of the present invention.

FIG. 3 is a block diagram of a mobile communication device 300 that presents media information to a user of the mobile communication device 300, in accordance with various aspects of the present invention. The mobile communication device 300 may, for example and without limitation, share various functional characteristics with the exemplary methods 100, 200 illustrated in FIGS. 1-2 and discussed previously.

The mobile communication device 300 may comprise characteristics of any of a variety of mobile communication devices. For example and without limitation, the mobile communication device 300 may comprise characteristics of a two-way communication device (e.g., a cellular telephone, mobile e-mail device, two-way pager, pocket computer with media communication and two-way communication capability, etc.). The scope of various aspects of the present invention should not be limited by characteristics of a particular type of mobile communication device.

As discussed previously, media information may comprise characteristics of any of a variety of types of information. For example and without limitation, media information may comprise multi-media, video, audio, textual, graphical, pictorial and other known types of information. Also for example, media information may comprise movie, television program, sporting event, gaming or music information. The term "media information" will be used in the following discussion to generally refer to any or all of such types of information.

The exemplary mobile communication device 300 may comprise a communication interface module 310 that generally manages and maintains one or more communication interfaces between the mobile communication device 300 and other communication systems. The communication interface module 310 may, for example, comprise a general communication interface module 314 that manages and/or maintains one or more general communication interfaces (or links) between the mobile communication device 300 and one or more other communication systems.

A general communication link may utilize any of a variety of communication media and any of a variety of communication protocols. For example and without limitation, a general communication link may comprise characteristics of a cellular telephone communication link, paging communication link or e-mail communication link. Also for example, a general communication link may comprise characteristics of a wired or wireless computer communication link. Further for example, a general communication link may comprise characteristics of a television, satellite or terrestrial telephone communication link.

In general, the general communication interface module 314 may manage and/or maintain any of a variety of communication links. Accordingly, the scope of various aspects of the present invention should not be limited by characteristics of a particular type of communication link or manner of maintaining or managing a particular type of communication link.

The communication interface module 310 may comprise a media communication interface module 312 that manages and/or maintains one or more media communication interfaces (or links) between the mobile communication device 300 and one or more other communication systems that communicate media information to (and/or from) the mobile communication device 300. The media communication interface module 312 may, for example and without limitation, share various characteristics with the general communication interface module 314 discussed previously. For example and without limitation, the media communication interface module 312 may comprise the capability to manage or maintain any general communication link.

A media communication link may generally comprise a communication link that is adapted to communicate media information to (and/or from) the mobile communication device 300. As mentioned previously, the media information may comprise any of a variety of media, including but not limited to, video, graphical, audio, pictorial or textual media. A media communication link may utilize any of a variety of communication media and any of a variety of communication protocols or techniques to communicate such media information (e.g., video and/or audio streaming). Accordingly, the scope of various aspects of the present invention should not be limited by characteristics of any particular media, any particular manner of communicating such media information, or any particular manner of managing or maintaining media communication links that communicate such media information.

The exemplary mobile communication device 300 may comprise a user interface module 330 that generally provides an interface between the mobile communication device 300 and the user. The user interface module 330 may comprise any of a variety of user interface devices. For example and without limitation, the user interface module 330 may comprise a video display, audio speaker, microphone, moving or still picture camera, keypad, touch pad, etc. In general, the user interface module 330 provides an interface between the mobile communication device 300 and a user. Accordingly, the scope of various aspects of the present invention should not be limited by characteristics of a particular user interface device or module.

The exemplary mobile communication device 320 may comprise a communication control module 320 that generally governs (or manages) operation of the mobile communication device 300 (e.g., in various modes of operation). The communication control module 320 may comprise a general communication control module 324 that, for example, manages operation of the mobile communication device 300 performing general communication. Such general communication may, for example and without limitation, comprise general cellular telephone communication. Such general communication may also, for example, comprise messaging or email communication. In a non-limiting exemplary scenario, the general communication module 324 may comprise managing the flow of information between the general communication interface module 314 and the user interface module 330.

The communication control module 320 may also comprise a media communication control module 322 that generally governs (or manages) operation of the mobile communication device 300 (e.g., in various media communication modes) during media communication. The media communication control module 322 may, for example, manage operation of the mobile communication device 300 receiving and presenting any of a variety of media information to a user (e.g., video, audio, graphical, pictorial or textual media information). The media communication control module 322 may generally perform various functional aspects of the exemplary methods 100, 200 illustrated in FIGS. 1-2 and discussed previously.

In a non-limiting exemplary scenario, the media communication control module 322 may manage the flow of media information between the media communication interface module 312 and the user interface module 330. In another non-limiting exemplary scenario, the media communication control module 322 may comprise directing media information to and from internal memory 340 (and/or an external memory device). For example, such operation may be implemented to manage variations in media information transfer speed or to manage media information flowing during control response latency periods. Such operation will be illustrated later by way of non-limiting examples.

In general, the communication control module 320 may generally govern operation of the mobile communication device 300. Accordingly, the scope of various aspects of the present invention should not be limited by characteristics of any particular manner of controlling operation of a mobile communication device.

As mentioned previously, the exemplary mobile communication device 300 may comprise any of a variety of memory (or buffer) types. For example, the mobile communication device 300 may comprise an internal memory (and/or an external or removable memory). A memory may comprise characteristics of any of a variety of memory types. For example and without limitation, a memory may comprise characteristics of a hard drive, mini hard drive, removable memory module or stick, on-board fixed non-volatile memory, etc. External memory, if utilized, may be communicatively coupled to the mobile communication device 300 through any of a variety of communication media and/or protocols. Accordingly, the scope of various aspects of the present invention should not be limited by characteristics of any particular memory device or memory type.

The following discussion will discuss general operation of portions of the mobile communication device 300 by way of non-limiting illustrative exemplary scenarios. It should be understood that the following exemplary scenarios are non-limiting, and as such, should not limit the scope of various aspects of the present invention.

In the first non-limiting exemplary scenario, the mobile communication device 300 (e.g., utilizing the media communication interface module 312) may receive a first portion of media information (e.g., a first portion of a unit of media information) from a media information source (e.g., a remote media information source). The mobile communication device 300 (e.g., utilizing the media communication interface module 312) may share various functional characteristics with step 110 of the exemplary method 100 illustrated in FIG. 1 and discussed previously.

As discussed previously, a "unit of media information" may, for example and without limitation, comprise a television program, a song, a slideshow, a movie, a music video, televised sporting event, an audio newscast, a stock ticker, etc. The media communication interface module 312 may receive the media information in any of a variety of manners (e.g., receiving media broadcast, multicast, unicast, streaming, etc.). The media communication interface module 312 may receive the media information over any of a variety of communication media and utilizing any of a variety of communication protocols. For example and without limitation, the media communication interface module 312 may receive the media information over a wireless RF medium and utilizing a cellular telephony communication protocol. Also, for example, the media communication interface module 312 may receive the media information through a wired, tethered optical or non-tethered optical medium, and utilizing any of a large variety of wired, wireless or optical communication protocols that are presently known or to be developed. In general, the mobile communication device 300 (e.g., utilizing the media communication interface module 312) may receive a first portion of media information (e.g., a first portion of a unit of media information). Accordingly, the scope of various aspects of the present invention should not be limited by characteristics of any particular manner of, or mechanism for, receiving media information.

Continuing the first non-limiting exemplary scenario, the mobile communication device 300 may also present the first portion of the unit of media information (e.g., as received by the media communication I/F module 312) to a user (e.g., utilizing the user interface module 330). The mobile communication device 300 (e.g., the media communication control module 322 and the user interface module 330) may share various functional characteristics with step 120 of the exemplary method illustrated in FIG. 1 and discussed previously.

For example, the media communication control module 322 may utilize the user interface module 330 to present the first portion of the media information to a user in any of a variety of manners. For example and without limitation, the media communication control module 322 may utilize the user interface module 330 to present the first portion of the media information to a user utilizing a video display, speaker, etc. The media communication control module 322 may also, for example, utilize the user interface module 330 to provide the user with various mechanisms (e.g., various display and audio control mechanisms) for controlling the presentation of the first portion of the media information to the user. In general, the mobile communication device 300 may (e.g., utilizing the media communication control module 322 and the user interface module 330) present the first portion of the unit of media information to a user. Accordingly, the scope of various aspects of the present invention should not be limited by any particular manner of, or mechanism for, presenting media information to a user.

The mobile communication device 300 may, for example, receive and present the first portion of the media information until the mobile communication device 300 receives a first signal. Such a first signal may, for example, be representative of a user input to the mobile communication device 300 (e.g., obtained by the user interface module 330). For example and without limitation, the first signal may result from a user input indicative of the user desiring to respond to an incoming communication or generate an initial outgoing communication. Also for example, the first signal may result from a user input indicative of the user desiring to change the manner in which a unit of media information is being presented to the user by the mobile communication device 300. For example, the first signal may be indicative of the user desiring to (at least temporarily) pause presentation of media information.

The first signal may also, for example, correspond to a signal originated by the mobile communication device. For example, the signal may correspond to an internally generated alarm or other user notification.

In a non-limiting exemplary scenario, the mobile communication device 300 may be presenting media information to a user (e.g., utilizing the user interface module 330) when an incoming communication arrives at the mobile communication device 300 (e.g., a cellular phone call). Continuing the exemplary scenario, the communication device 300 may utilize the user interface module 330 to provide the user with an indication of the incoming communication and provide the user with options for responding to the incoming communication. For example, the exemplary communication device 300 may utilize the user interface module 330 to notify the user of the incoming communication by providing a visible, audible and/or tactile indication. The user may then, for example, provide input to the mobile communication device 300 (e.g., through the user interface module 330) to direct the mobile communication device 300 in handling the incoming communication. For example the user may provide an input directing the mobile communication device 300 to ignore the incoming communication, direct the incoming communication to a messaging function, or answer the incoming communication. A user input directing the mobile communication device 300 to answer the incoming communication provides a non-limiting example of a first signal that may interrupt the presentation of the first portion of the media information to the user.

Alternatively, for example, the first signal may originate at another communication system (or be indicative of a signal originating at another communication system). The mobile communication device 300 may, for example, receive such a signal with the general communication interface module 314 (or alternatively, the media communication interface module 312). For example and without limitation, the first signal may originate at a remote communication system that is attempting to communicate with the mobile communication device 300 (e.g., with the user). For example, in this scenario, the first signal may comprise a signal indicative of an incoming telephone call, videophone call, instant text message or email message.

Note that such a communication system (e.g., a remote communication system) may be the same communication system that is communicating the media information to the mobile communication device 300 or may be independent. In a non-limiting exemplary scenario, the mobile communication device 300 may, for example, receive a first portion of a unit of media information from a cellular telephone communication system and may also receive the first signal from the cellular telephone communication system, where the first signal is indicative of an incoming telephone call for the mobile communication system 300.

In general, the first signal may comprise any of a variety of signal characteristics and may originate at any of a variety of sources. Accordingly, the scope of various aspects of the present invention should not be limited by characteristics of any particular signal or any particular manner of, or mechanism for, receiving such a signal.

In response to receiving the first signal, the mobile communication device 300 may, for example, cease presenting the first portion of the media information to the user (e.g., utilizing the media communication control module 322 and the user interface module 330). The mobile communication device 300 may, for example, cease presentation of the first portion of the media information in any of a variety of manners, which may depend on the type of media information being presented. For example and without limitation, the media communication control module 322 may direct the user interface module 330 to blank a video output screen or present a display-saver image, silence an audio output speaker, freeze an image on a video output screen, etc.

Also for example, the mobile communication device 300 may (e.g., utilizing the user interface module 330) output a user interface indication on a video output screen that is related to the received first signal. As a non-limiting example, the communication control module 320 may utilize the user interface module 330 to present the user with options concerning how to handle an incoming communication. As another non-limiting example, the communication control module 320 may utilize the user interface module 330 to present the user with options concerning how to resume presentation of the media information. As still another non-limiting example, the communication control module 320 may utilize the user interface module 330 to present the user with options for executing any of a variety of functionality provided by the mobile communication device 300.

As will be discussed in more detail below, the mobile communication device 300 may transmit a first control signal to the media information source, where the first control signal may be adapted to cause the media information source to stop communicating the media information to the mobile communication device. In such a scenario, for example where there may be significant latency between transmitting the first control signal and stopping communication of the media information at the media information source, the mobile communication device 300 may (e.g., directing the user interface module 330) stop the presentation of the first portion of media information while the first portion of media information is still arriving (e.g., either ignoring the arriving media information or buffering the arriving media information for later presentation). Also, for example in an exemplary scenario where the latency period is relatively small, the mobile communication device 300 may stop the presentation of the first portion of media information when the media information stops arriving from the media information source. Accordingly, depending on the particular implementation and/or the media information communication environment, the mobile communication device 300 may stop presenting the first portion of the media information prior to transmitting such a first control signal, concurrently with transmitting such a first control signal, or after transmitting such a control signal.

In general, the mobile communication device 300 may, for example in response to receiving a first signal (or alternatively, in an attempt to solicit such a first signal from a user), cease presentation of the first portion of the media information. Accordingly, the scope of various aspects of the present invention should not be limited by characteristics of any particular manner of, or mechanism for, ceasing such presentation or by characteristics of any additional related user interface capability that may be provided.

The exemplary mobile communication device 300 may (e.g., utilizing the media communication interface module 312) transmit a control signal to the media information source (e.g., the remote media information source), where the control signal is adapted to cause the media information source to stop transmitting the media information (e.g., the unit of media information). The mobile communication device 300 (e.g., the media communication interface module 312) may transmit the control signal to the media information source in any of a variety of manners. For example and without limitation, the mobile communication device 300 may transmit the control signal to the media information source over a dedicated reverse communication channel associated with a communication channel over which the media information source is communicating the media information to the mobile communication device 300. Also for example, the mobile communication device 300 may transmit a control signal to the media information source over a reverse communication channel that is shared between many mobile communication devices to control their respective media information flows.

Though, in the first non-limiting exemplary scenario, the control signal is adapted to cause the media information source to stop transmitting the media information, in other alternative non-limiting exemplary scenarios, the mobile communication device 300 may transmit a control signal to the media information source, where the control signal is adapted to cause the media information source to modify the transmission of the media information in any of a number of ways (e.g., transmission rate, forward or reverse direction, temporal or spatial resolution, etc.).

In general, the mobile communication device 300 may transmit a control signal to the media information source (e.g., where the control signal is adapted to cause the media information source to stop transmitting the media information). Accordingly, the scope of various aspects of the present invention should not be limited by the characteristics of any particular control signal or characteristics of any particular manner of, or mechanism for, transmitting a control signal to a media information source.

Continuing the first non-limiting exemplary scenario, the mobile communication device 300 may wait for a second signal. The mobile communication device 300 may, for example and without limitation, share various functional characteristics with step 145 of the exemplary method 100 illustrated in FIG. 1 and discussed previously. For example, while waiting for such a second signal, the mobile communication device 300 may perform any of a large variety of functions. For example and without limitation, while waiting for the second signal, the mobile communication device 300 may perform a second communication (e.g., not related to the communication involving the media information). For example such a second communication may comprise characteristics of a cellular phone call (audio and/or video), text message communication, email communication, instant messaging, etc. Also for example, while waiting for the second signal, the mobile communication device 300 may perform gaming functionality, word processing or spreadsheet functionality, personal time management functionality, etc. Accordingly, the scope of various aspects of the present invention should not be limited by characteristics of any particular functionality that may be performed while the mobile communication device 300 is waiting for the receipt of the second signal.

The second signal may comprise any of a variety of characteristics. For example and without limitation, the second signal may be representative of a user input indicative of the user ending a communication (e.g., ending a phone call, completing transmission of a message, etc.) or other function (e.g., making a notebook entry, finishing a game, etc.). Also for example, the second signal may result from a user input indicative of the user desiring to change the manner in which a unit of media information is being presented to the user by the mobile communication device 300. For example, the second signal may be indicative of the user desiring to resume normal presentation of media information, the presentation of which was previously altered (e.g., in response to the first signal).

Alternatively, for example, the second signal may originate at a remote source (e.g., a remote communication system). For example and without limitation, the second signal may originate at a remote communication system that is completing communication with the mobile communication device 300 (e.g., indicating that the remote communication system has completed communicating with the mobile communication device 300). In general, the second signal may comprise any of a variety of signal characteristics and may originate at any of a variety of sources. Accordingly, the scope of various aspects of the present invention should not be limited by characteristics of any particular signal.

Continuing the first non-limiting exemplary scenario, the mobile communication device 300 may (e.g., utilizing the media communication interface module 312) transmit a second control signal to the media information source (e.g., the remote media information source). The second control signal may, for example, be adapted to cause the media information source to resume transmitting the media information (e.g., the unit of media information) to the mobile communication device 300. The mobile communication device 300 may, for example and without limitation, share various functional characteristics with step 150 of the exemplary method 100 illustrated in FIG. 1 and discussed previously. For example, the mobile communication device 300 may transmit the second control signal to the media information source in any of a variety of manners, some of which were discussed previously with regard to the first control signal.

The second control signal may comprise any of a variety of control signal characteristics. For example and without limitation, the second control signal may comprise characteristics of a predefined command to the media information source to resume the transmission of media information to the mobile communication device 300. Also for example, the second control signal may comprise information identifying the mobile communication device 300 and/or identifying the media information (e.g., the unit of media information), the transmission of which was stopped as a result of a first control signal (e.g., as transmitted previously in the first non-limiting exemplary scenario). Further for example, the second control signal may comprise information identifying a particular point in the media information. Such a particular point in the media information may, for example, be representative of where presentation of the media information was previously stopped (e.g., in response to the first signal) or where in the media information a user desires presentation of the media information to resume. Accordingly, the scope of various aspects of the present invention should not be limited by characteristics of any particular control signal.

Though, in this first non-limiting exemplary scenario, the second control signal transmitted may be adapted to cause the media information source to resume transmitting the media information, in other alternative non-limiting exemplary scenarios, the mobile communication device 300 may transmit a control signal to the media information source, where the control signal is adapted to cause the media information source to modify the transmission of the media information in any of a number of ways (e.g., transmission rate, forward or reverse direction, temporal or spatial resolution, etc.).

In general, the mobile communication device 300 may transmit a second control signal to the media information source (e.g., where the second control signal is adapted to cause the media information source to resume transmitting the media information). Accordingly, the scope of various aspects of the present invention should not be limited by the characteristics of any particular control signal or characteristics of any particular manner of, or mechanism for, transmitting a control signal to a media information source.

Continuing the first non-limiting exemplary scenario, the mobile communication device 300 may (e.g., utilizing the media communication interface module 312) receive a second portion of the media information (e.g., a second portion of the unit of media information, the first portion of which was received and presented previously in the first non-limiting exemplary scenario) from the media information source (e.g., a remote media information source). The mobile communication device 300 may, for example and without limitation, share various functional characteristics with step 160 of the exemplary method 100 illustrated in FIG. 1 and discussed previously.

For example and without limitation, a second portion of the media information may comprise a second portion of a television program or period of television programming, a song, a slideshow, a movie, a music video, a televised sporting event, an audio newscast, a stock ticker, etc., where the first portion was received and presented previously in the first non-limiting exemplary scenario. For example, the second portion of the media information may begin where the first portion of the media information stopped.

As discussed previously with regard to the first portion of the media information, the mobile communication device 300 may (e.g., utilizing the media communication interface module 312) receive the media information in any of a variety of manners (e.g., receiving media broadcast, multicast, unicast, streaming, etc.), which may, for example but not necessarily, comprise the same manner in which the first portion of the media information was received. Also, the mobile communication device 300 may, for example, receive the media information over any of a variety of communication media and utilizing any of a variety of communication protocols. In general, the mobile communication device 300 may receive a second portion of media information (e.g., a second portion of the unit of media information, the first portion of which was received previously). Accordingly, the scope of various aspects of the present invention should not be limited by characteristics of any particular manner of receiving media information.

Continuing the first non-limiting exemplary scenario, the mobile communication device 300 may (e.g., utilizing the user interface module 330) present the second portion of the media information (e.g., a second portion of the unit of media information, the first portion of which was presented previously in the first non-limiting exemplary scenario) to the user. The mobile communication device 300 may, for example and without limitation, share various functional characteristics with step 170 of the exemplary method 100 illustrated in FIG. 1 and discussed previously. For example, the mobile communication device 300 may present the second portion of the media information to the user in any of a variety of manners. For example and without limitation, the mobile communication device 300 may present the second portion of the media information in a manner similar to that utilized previously in the first non-limiting exemplary scenario to present the first portion of the media information.

In presenting the second portion of the media information (e.g., a second portion of the unit of media information) to the user, the mobile communication device 300 may, for example, utilize the user interface module 300 to provide media presentation control features to the user. For example, the mobile communication device 300 may provide the user the ability to specify presentation of the second portion of the media information in fast-forward mode. In providing such capability, the mobile communication device 300 may provide a user with the capability to initiate transmission of a fast-forward control signal (e.g., utilizing the media communication interface module 312). Such a fast-forward control signal may, for example, be adapted to cause the media information source to communicate the media information to the mobile communication device 300 in a sequentially forward manner and at a faster rate than normal. The mobile communication device 300 may, for example, provide the user with the capability to initiate the transmitting of various presentation control signals to the media information source (e.g., various trick play control signals).

In a non-limiting example, the media information may correspond to a real-time event (e.g., a live newscast or sporting event). In the example, the mobile communication device 300 may have presented a first portion of the media information to the user (e.g., utilizing the user interface module 330) generally as the first portion of the media information was received (e.g., by the media communication interface module 312). Continuing the example, the mobile communication device 300 may then also present the second portion of the media information to the user as the second portion of the information is received at step 160. The second portion of the media information may begin, for example, where the first portion stopped. Note that because of temporal delay in presenting the second portion of the media information, for example caused by time difference between the first and second received signals, the second portion of the media information may now lag real-time. Accordingly, in the example, the mobile communication device 300 may provide the user the ability to specify fast-forward presentation of the second portion of the media information to catch up to real-time. Alternatively, for example, the mobile communication device 300 may provide the user the ability to skip temporally lagging media information and immediately catch up to real-time.

Further for example, the mobile communication device 300 may provide a rewind (or review) capability to the user. In providing such capability, the mobile communication device 300 may utilize the user interface module 330 to provide a user with the capability to initiate the transmission of a rewind control signal (e.g., utilizing the media communication interface module 312) to the media information source. Such a rewind control signal may, for example, be adapted to cause the media information source to communicate the media information to the mobile communication device 300 in a sequentially reversed manner. Alternatively, for example, the mobile communication device 300 may retain a particular amount of previously presented media information in a media buffer 340 (which may, for example, be an internal media buffer, as shown, or an external media buffer) and provide a user interface allowing the user to specify rewinding or reviewing such media information.

As another example of user interface capability, the mobile communication device 300 may utilize the user interface module 330 to provide to the user an indication of the point in the media information that the user is presently consuming the media information. For example and without limitation, the mobile communication device 300 may provide to the user an indication of a percentage of completeness of a unit of media information. Also for example, the mobile communication device 300 may provide to the user an indication of the temporal relationship between media information being presented to the user and corresponding real-time media information. Such an indication may comprise any of a variety of graphical or textual characteristics (e.g., on-screen text information, on-screen scroll bar, menu selection, etc.). Such an indication may also comprise various audible characteristics (e.g., an audible indication that a user has caught up to the real-time information or is temporally lagging).

Note that the above-mentioned user interface examples are merely exemplary and by no means meant to represent a limiting set of user interface characteristics. Accordingly, the scope of various aspects of the present invention should not be limited by characteristics of particular user interface features.

Continuing the first non-limiting exemplary scenario, the mobile communication device 300 may, for example, perform any of a large variety of additional functionality. For example and without limitation, the mobile communication device 300 may share various functional characteristics with step 195 of the exemplary method 100 illustrated in FIG. 1 and discussed previously.

Such continued processing may comprise characteristics of any of a variety of continued processing. For example and without limitation, the mobile communication device 300 may receive and present a third portion of the media information to the user. The mobile communication device 300 may also, for example, provide media presentation control capability for the third portion similar to that discussed previously with regard to the first and second portions of the media information. Additionally, for example, the mobile communication device 300 may stop presentation of the second portion of the media information (e.g., in a manner similar to that discussed with regard to the first portion), and then presenting a third portion of the media information to the user. Accordingly, the scope of various aspects of the present invention should not be limited by characteristics of any particular continued processing that may be performed.

The first non-limiting exemplary scenario involving the mobile communication device 300 was presented to provide specific illustrations of various generally broader aspects of the present invention. Accordingly, the scope of various aspects of the present invention should not be limited by characteristics of the first non-limiting exemplary scenario.

The following discussion will now illustrate general operation of portions of the mobile communication device 300 by way of a second non-limiting exemplary scenario. It should be understood that the following exemplary scenario is non-limiting, and as such, should not limit the scope of various aspects of the present invention. In the second non-limiting exemplary scenario, the mobile communication device 300 may function generally in accordance with the exemplary method 200 illustrated in FIG. 2 and discussed previously.

In the second non-limiting exemplary scenario, the mobile communication device 300 may perform a first communication with a media information source (e.g., a remote media information source). The mobile communication device 300 may (e.g., utilizing the media communication interface module 312) receive a first portion of media information (e.g., a first portion of a unit of media information). The mobile communication device 300 may also (e.g., utilizing the user interface module 330) present the first portion of the media information to a user. The mobile communication device 300 may, for example and without limitation, share various functional characteristics with steps 210-215 of the exemplary method 200 illustrated in FIG. 2 and discussed previously.

Continuing the second non-limiting exemplary scenario, the mobile communication device 300 (e.g., the communication control module 320) may, for example, while performing the first communication, determine to begin a second communication. The mobile communication device 300 may make such a determination in any of a variety of manners. For example and without limitation, the mobile communication device 300 may receive a signal indicating that the second communication is to begin. Such a signal may, for example, comprise a signal from a user (e.g., received through the user interface module 330) or a signal from another communication system (e.g., received through the communication interface module 310). For example and without limitation, such a signal may comprise a signal from a user expressing a desire to answer an incoming communication or initiate a new communication. Also for example, such a signal may comprise a signal from another communication system notifying the mobile communication device of an incoming new communication. The scope of various aspects of the present invention should not be limited by characteristics of any particular received signal indicating that a communication is to begin or any particular manner of, or mechanism for, determining whether a communication is to begin.

In a non-limiting example, the mobile communication device 300 may be performing a first communication and presenting media information to a user when an incoming communication arrives at the mobile communication device 300 (e.g., a cellular phone call). The mobile communication device 300 may then utilize the user interface module 330 to provide the user with an indication of the incoming communication (e.g., while presenting the media information or while, at least temporarily, stopping presentation of the media information) and provide the user with options for responding to the incoming communication. For example, the mobile communication device 300 may notify the user of the incoming communication by providing a visible, audible and/or tactile indication. The user may then, for example, utilize the user interface module 330 to provide input to the mobile communication device 300 to direct the mobile communication device 300 in handling the incoming communication. For example the user may provide an input directing the mobile communication device 300 to ignore the incoming communication, direct the incoming communication to a messaging function, or answer the incoming communication.

Continuing the second non-limiting exemplary scenario, the mobile communication device 300 may perform the second communication. The mobile communication device 300 may, for example, stop presentation of the media information (e.g., the first portion of a unit of media information) to the user. The mobile communication device 300 may, for example and without limitation, share various functional characteristics with step 222 of the exemplary method 200 illustrated in FIG. 2 and discussed previously.

The mobile communication device 300 may also, for example, stop the first communication. For example, the mobile communication device 300 may utilize the media communication interface module 312 (or other module) to transmit a first control signal to the media information source, where the first control signal is adapted to cause the media information source to stop the first communication (i.e., the communication communicating the media information to the mobile communication device 300). For example and without limitation, the mobile communication device 300 may share various functional characteristics with step 224 of the exemplary method 200 illustrated in FIG. 2 and discussed previously.

Continuing the second non-limiting exemplary scenario, the mobile communication device 300 may perform the second communication. The second communication may comprise characteristics of any of a variety of communication types. The second communication may, for example, be entirely independent of the first communication or may be related to the first communication. For example, the second communication may comprise characteristics of a cellular phone call (audio and/or video), text message communication, email communication, instant messaging, etc. The mobile communication device 300 may (e.g., utilizing the general communication interface module 314 or media communication interface module 312) perform the second communication over any of a large variety of communication media, through any of a large variety of communication networks, and using any of a variety of communication protocols. For example, the mobile communication device 300 may perform the second communication with the same communication network as the first communication or a different communication network. In general, the mobile communication device 300 may perform the second communication. Accordingly, the scope of various aspects of the present invention should not be limited by characteristics of any particular type of communication.

Continuing the second non-limiting exemplary scenario, after performing the second communication, the mobile communication device 300 may wait for an indication to resume the first communication (i.e., the first communication or another communication communicating the media information). The mobile communication device 300 may, for example and without limitation, share various functional characteristics with step 230 of the exemplary method 200 illustrated in FIG. 2 and discussed previously. For example, the mobile communication device 300 may wait for a second signal indicating that it is time to resume the first communication. As discussed previously, such a second signal may comprise any of a variety of characteristics.

Alternatively, the mobile communication device 300 may bypass waiting for a second signal and immediately proceed to resuming the first communication after performing the second communication. For example and without limitation, in an example where the second communication was a cellular phone call, upon completion of the cellular phone call, the mobile communication device 300 may immediately resume the first communication.

Continuing the second non-limiting exemplary scenario, the mobile communication device 300 (e.g., the communication control module 320 and other modules) may resume the first communication and perform various related activities. For example and without limitation, the mobile communication device 300, may share various functional characteristics with step 240 of the exemplary method 200 illustrated in FIG. 2 and discussed previously. Resuming the first communication may, for example, comprise utilizing the media communication interface module 312 to resume communication of the media information from the media information source to the mobile communication device 300. For example, resuming the first communication may result in the communication of a second portion of the media information (e.g., a second portion of the unit of media information), the first portion of which was received and presented at steps 212 and 214. The second portion of the media information may, for example, be subsequent and temporally adjacent to the first portion of the media information, which was communication previously.

As discussed previously, the mobile communication device 300 may resume the first communication. The mobile communication device 300 may, for example and without limitation, share various functional characteristics with step 242 of the exemplary method 200 illustrated in FIG. 2 and discussed previously. The mobile communication device 300 may, for example, resume the first communication by, at least in part, transmitting a second control signal (e.g., utilizing the media communication interface module 312) to the media information source, where the second control signal is adapted to cause the media information source to resume the first communication. The media information source may then, for example, resume transmitting the media information to the mobile communication device 300. For example, the media information source may resume transmitting the media information at or near the point at which presentation of the media information was previously, while the second communication was being performed.

Continuing the second non-limiting exemplary scenario, the mobile communication device 300 may also receive (e.g., utilizing the media communication interface module 312) and present (e.g., utilizing the user interface module 330) the second portion of the media information (e.g., a second portion of the unit of media information) to the user of the mobile communication device 300. The mobile communication device 300 may, for example and without limitation, share various functional characteristics with steps 244 and 246 of the exemplary method 200 illustrated in FIG. 2 and discussed previously. For example, the mobile communication device 300 may receive and present the second portion of the media information in a manner similar to that in which the mobile communication device 300 received and presented the first portion of the media information, discussed previously.

The second non-limiting exemplary scenario was presented to provide specific illustrations of various generally broader aspects of the present invention. Accordingly, the scope of various aspects of the present invention should not be limited by characteristics of the second non-limiting exemplary scenario.

Figure 4:
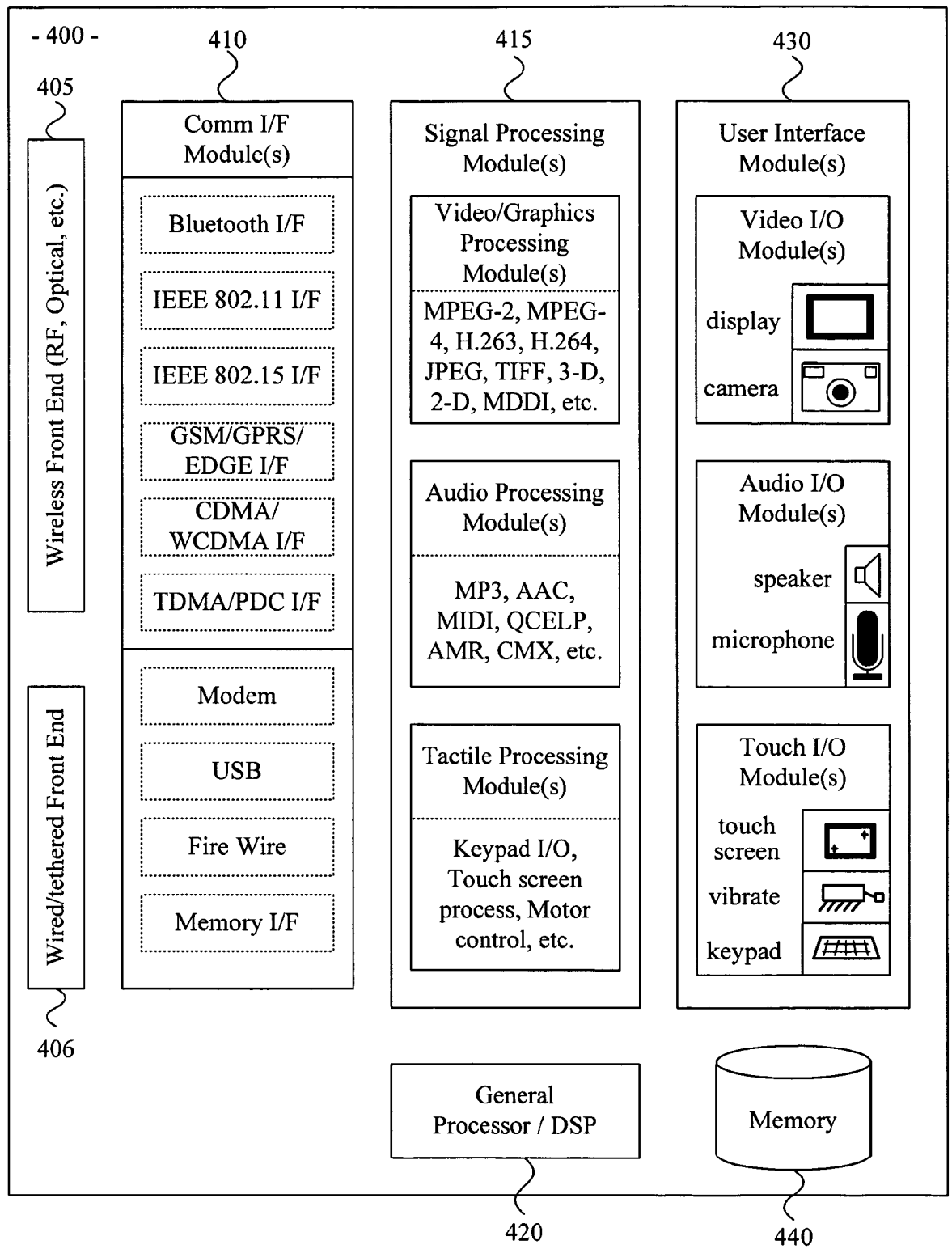
FIG. 4 is a block diagram of a cellular phone that presents media information to a user of the cellular phone, in accordance with various aspects of the present invention.

FIG. 4 is a block diagram of a cellular phone 400 that presents media information to a user of the cellular phone 400, in accordance with various aspects of the present invention. The cellular phone 400 may, for example and without limitation, share various characteristics with the exemplary mobile communication device 300 illustrated in FIG. 3 and discussed previously. Further for example, the cellular phone 400 may share various functional characteristics with the exemplary methods 100, 200 illustrated in FIGS. 1-2 and discussed previously.

The exemplary cellular phone 400 may comprise a wireless front end 405 and/or a wired/tethered front end 406. The wireless front end 405 and the wired/tethered front end 406 may be communicatively coupled to any of a variety of communication interface modules 410. The exemplary cellular phone 400 is illustrated with a non-limiting exemplary set of communication interface modules 410, including: a Bluetooth interface module, IEEE 802.11 interface module, IEEE 802.15 interface module, GSM/GPRS/EDGE interface module, CDMA/WCDMA interface module, TDMA/PDC interface module, modem module, USB module, fire wire module and memory interface module (e.g., for interfacing with off-board or removable memory). The wireless front end 405, wired/tethered front end 406 and communication interface modules 410 may, for example and without limitation, share various characteristics with the communication interface module(s) 310 (e.g., including the general communication interface module 314 and the media communication interface module 312) of the exemplary mobile communication device 300 illustrated in FIG. 3 and discussed previously.

The exemplary cellular phone 400 may also comprise any of a variety of user interface modules 430. The user interface modules 430 may, for example and without limitation, share various characteristics with the user interface module 330 of the exemplary system 300 illustrated in FIG. 3 and discussed previously. The exemplary cellular phone 400 is illustrated with a non-limiting exemplary set of user interface modules 430 (or sub-modules). The user interface modules 430 may, for example, comprise any of a variety of video/graphics processing modules, audio processing modules, and tactile signal processing modules. The cellular phone 400 may also comprise compatible user interface devices corresponding to the various user interface modules 430 (e.g., a video display, camera, speaker, microphone, touch screen, keypad, vibrator, etc.).

The exemplary cellular phone 400 is illustrated with a non-limiting exemplary set of signal processing modules 415, which may be selectively utilized in accordance with current signal processing needs. The signal processing modules 415 may, for example, comprise various video, audio, textual and tactile signal processing modules. The signal processing modules 415 may generally, for example, process information conveyed between the front ends 405, 406 and communication interface module(s) 410 of the cellular phone 400 and the user interface 430 of the cellular phone 400.

The exemplary cellular phone 400 may also comprise a general processor 420 (and/or a digital signal processor) and on-board memory 440. The general processor 420, which may be a baseband processor for example, and memory 440 may perform any of a wide variety of operational tasks for the cellular phone 400. For example and without limitation, the general processor 420 and memory 440 may share various characteristics with the communication control module(s) 320 and media buffer(s) 340 of the exemplary system 300 illustrated in FIG. 3 and discussed previously.

It should be noted that various modules of the previously discussed exemplary mobile communication device 300 and cellular phone 400 may be implemented in hardware, software, or a combination thereof. Also, various modules may share portions of hardware and software. For example, a first and second module may share one or more hardware components and/or one or more software routines. Accordingly, the scope of various aspects of the present invention should not be limited by any particular hardware or software implementation of the various modules or by arbitrary hardware and software boundaries between the various modules.

Further, the various modules of the exemplary mobile communication device 300 and cellular phone 400 may be implemented in various degrees of integration. For example and without limitation, the modules may all be integrated on a single chip. Also for example, the various modules may be implemented in separate chips of a single circuit board. Accordingly, the scope of various aspects of the present invention should not be limited by characteristics of any particular implementation or level of integration of the various exemplary modules.

Figure 5:
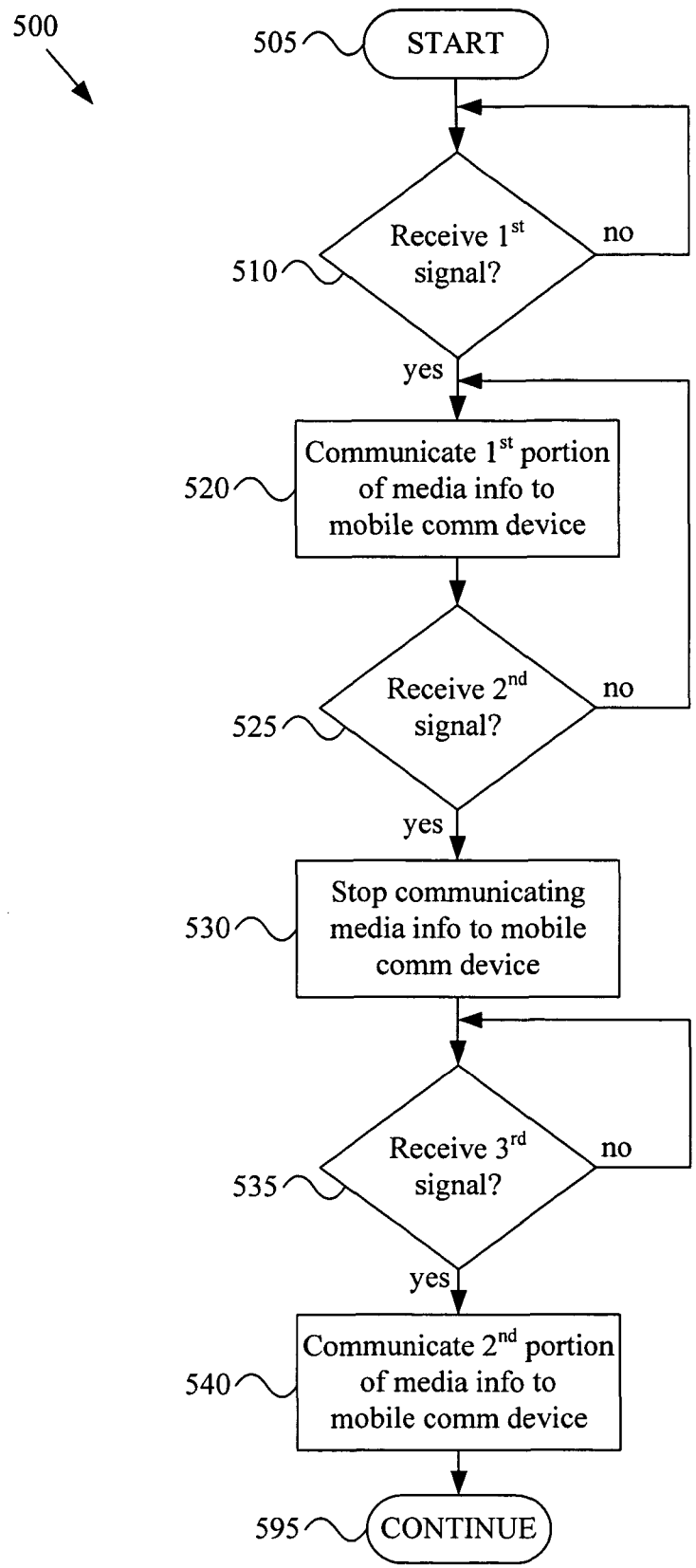
FIG. 5 is a diagram illustrating a method for communicating media information to a mobile communication device, in accordance with various aspects of the present invention.

FIG. 5 is a diagram illustrating a method 500 for communicating media information to a mobile (or portable) communication device, in accordance with various aspects of the present invention. Portions of the exemplary method 500 may, for example and without limitation, share various characteristics with, or be compatible with, the exemplary methods 100, 200 illustrated in FIGS. 1-2 and discussed previously. Also, a system implementing the exemplary method 500 may, for example and without limitation, be generally capable of communicating media information to the exemplary mobile communication device 300 and/or cellular phone 400 illustrated in FIGS. 3-4 and discussed previously.

The exemplary method 500 may, for example, be implemented in any of a variety of systems capable of communicating media information to a mobile communication device. For example and without limitation, the method 500 may be implemented in a relatively large-scale network media information server, which is communicatively coupled to a nationwide or citywide communication network (e.g., a cellular phone network). Also for example, the method 500 may be implemented in a home personal media recorder or a personal computer that are capable of communicating media information to a mobile communication device in the immediate vicinity of the home. Further for example, the method 500 may be implemented by a media information server that is communicatively coupled to a local area network that is capable of communicating the media information to mobile communication devices within the boundaries of the local area network. In general, the method 500 may be implemented in any of a variety of media information systems. Accordingly, the scope of various aspects of the present invention should not be limited by characteristics of a particular type of media information source or particular communication network that may couple a media information source to one or more mobile communication devices.

A system implementing the exemplary method 500 may be capable of communicating media information to one or more mobile communication devices through any of a variety of communication pathways, utilizing various media, protocols, standards, etc., some of which were discussed previously with regard to the exemplary methods and systems illustrated in FIGS. 1-4. In a non-limiting exemplary scenario, a system implementing the exemplary method 500 may communicate media information to a mobile communication device (e.g., a cellular telephone) over a cellular communication network. In another exemplary scenario, a system implementing the exemplary method 500 may communicate media information to a mobile communication device, at least in part, through a computer network (e.g., the Internet). In yet another exemplary scenario, a system implementing the exemplary method 500 may communicate media information to a mobile communication device, at least in part, through a personal area network. In yet another exemplary scenario, a system implementing the exemplary method may communicate media information (or at least a portion of media information) to a mobile communication device through broadcast media channels. Accordingly, the scope of various aspects of the present invention should not be limited by characteristics of any particular communication pathway, medium, protocol, or methods and devices associated therewith.

Note that in communicating media information to a mobile communication device, a system implementing the exemplary method 500 may perform any of a variety of media information processing functions. Such media processing functions may, for example and without limitation, comprise media data compression, encryption, modulation, encoding, etc. In a non-limiting exemplary scenario, a home personal media recorder or a networked media information server may comprise media information at a relatively high resolution, and the home personal media recorder may compress the media information and/or encode the media information to make such information compatible with the user media interface of the mobile communication device. Such compression may, for example, comprise communicating only media information to the mobile communication device that the mobile communication device is capable of presenting to a user.

The exemplary method 500 may begin at step 505. The exemplary method 500 may begin executing for any of a variety of reasons. For example and without limitation, the method 500 may begin executing in response to an explicit user command to begin. Also for example, the method 500 may begin executing upon system reset or power-up. Further for example, the method 500 may begin in response to a request from another communication system (e.g., a remote mobile communication device) to begin. Accordingly, the scope of various aspects of the present invention should not be limited by characteristics of any particular initiating cause or condition.

The exemplary method 500 may, at step 510, comprise waiting for a first signal. Such a first signal may, for example, comprise characteristics of a signal communicated from a mobile communication device (e.g., a cellular phone) directing the system implementing the method 500 to begin communicating media information to the mobile communication device. Such a first signal may comprise any of a variety of characteristics. For example and without limitation, the first signal may comprise an indication of a particular unit of media information (e.g., a movie, television program, song, station, sporting event, etc.). Also for example, the first signal may comprise billing information, secure communication information, customer identification information, mobile communication device identification information, etc. The scope of various aspects of the present invention should not be limited by characteristics of any particular information that the first signal may comprise or by characteristics of any particular type of signal.

Upon receipt of the first signal, execution of the exemplary method 500 may flow to step 520, which may comprise communicating a first portion of media information (e.g., a first portion of a unit of media information) to at least one mobile communication device. Various characteristics of media information (including units of media information) were discussed previously. Step 520 may, for example, comprise communicating the first portion of media information to the at least one mobile communication device in any of a variety of manners, many examples of which were discussed previously. For example and without limitation, step 520 may comprise communicating the first portion of media information utilizing data streaming over a dedicated unicast channel to the mobile communication device. As a non-limiting example, such a channel may comprise a cellular phone communication channel. Step 520 may also, for example, comprise communicating the first portion of the media information to the mobile communication device in a first manner (e.g., at a first information transfer rate, temporal direction, data resolution, encoding type, encryption scheme, etc.).

The exemplary method 500 may comprise, at step 520, communicating the first portion of media information to the mobile communication device in a first manner, until a second signal is received. For example, step 525 may direct execution flow of the exemplary method to step 520 until the arrival of the second signal.

The second signal may comprise any of a variety of characteristics. For example and without limitation, the second signal may originate at a mobile communication device that is receiving the first portion of media information that is being communicated at step 520. Such a second signal may, for example, comprise media information flow control information (e.g., a command to alter the flow characteristics of the media information being communicated). For example and without limitation, the second signal may comprise an indication for the system implementing the method 500 to stop communicating the media information. Also for example, the second signal may comprise an indication for the system implementing the method 500 to otherwise modify the flow of the communicated media information (e.g., start, stop, speed up, slow down, change temporal direction, alter spatial or temporal resolution etc.).

Also, for example and without limitation, the second signal may comprise characteristics of an incoming or outgoing communication related to the mobile communication device. In a non-limiting exemplary scenario, a general communication system (e.g., a cellular communication system) may be implementing the exemplary method 500. In such a non-limiting exemplary scenario, the general communication system may receive a second signal that is indicative of an incoming communication (e.g., a cellular phone call) destined for the mobile communication device (e.g., a cellular phone). In another exemplary scenario, the second signal may originate at the mobile communication device and comprise characteristics indicative of a user of the mobile communication device desiring to service an incoming call or initiate an outgoing call.

In general, the second signal may comprise any of a variety of characteristics. Accordingly, the scope of various aspects of the present invention should not be limited by characteristics of any particular type of signal or any particular type of information that such a signal may comprise.

In response to receiving the second signal at step 525, the exemplary method 500 may, at step 530, comprise stop communicating the first portion of the media information to the mobile communication device. The method 500 may, at step 535, wait for a third signal before resuming communication of the media information to the mobile communication device.

In the non-limiting exemplary scenario discussed previously, where the second signal corresponded to an incoming or outgoing communication to the mobile communication device (e.g., a communication independent of the media information), step 530 may comprise ceasing communication of the media information to the mobile communication device until step 535 receives a third signal that indicates the incoming or outgoing communication has ended. Such a signal may originate at the mobile communication device or at another device in the communication network. In another non-limiting exemplary scenario, where the second signal corresponded to an incoming or outgoing communication to the mobile communication device, step 530 may comprise ceasing communication of the media information to the mobile communication device until a third signal is received that indicates the user has explicitly expressed a desire to resume communication of the media information to the mobile communication device. In general, the third signal may comprise characteristics of any of a variety of signals. Accordingly, the scope of various aspects of the present invention should not be limited by characteristics of any particular type of signal.

In response to receiving the third signal at step 535, the exemplary method 500 may, at step 540, comprise communicating a second portion of the media information (e.g., a second portion of the unit of media information) to the at least one mobile communication device. The second portion of the media information may, for example, comprise a portion of the media information that is temporally adjacent to the first portion (e.g., communicated at step 520). Also for example, the second portion of the media information may, for example, comprise at least some of the first portion of the media information that was previously communicated at step 520 (e.g., repeating a portion of the media information to help a consumer of such media information at the mobile communication device transition between the first and second portions).

Step 540 may comprise communicating the second portion of the media information to the mobile communication device in any of a variety of manners, some of which were discussed previously with regard to step 520 and corresponding steps of the exemplary methods 100, 200 illustrated in FIGS. 1-2 and discussed previously. Step 540 may also, for example, comprise communicating the second portion of the media information to the mobile communication device in a second manner (e.g., at a second information transfer rate, temporal direction, data resolution, encoding type, encryption scheme, etc.), which may be the same or different from the first manner of step 520. The scope of various aspects of the present invention should not be limited by characteristics of any particular manner of communicating media information to a mobile communication device.

The exemplary method 500 may, at step 595, comprise performing continued operation. Such continued operation may comprise characteristics of any of a large variety of continued operation functionality. For example and without limitation, step 595 may comprise receiving and processing additional signals and modifying communication of media information in response to such signals. The scope of various aspects of the present invention should not be limited by characteristics of any particular operation that the step 595 may comprise performing.

The previous exemplary method 500 was presented to provide specific illustrations of various generally broader aspects of the present invention. Accordingly, the scope of various aspects of the present invention should not be limited by characteristics of the previously discussed exemplary method 500.

Figure 6:
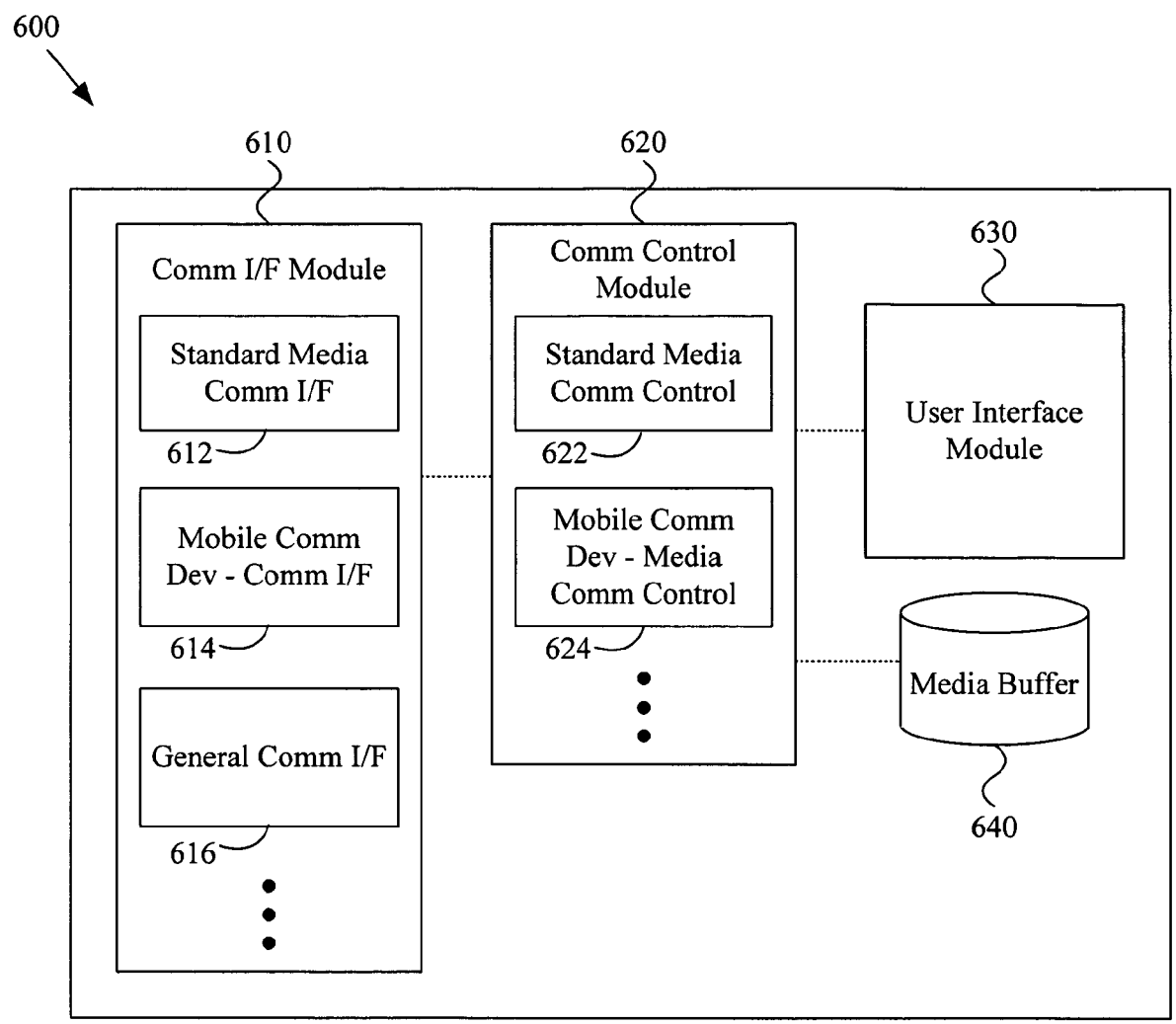
FIG. 6 is a block diagram of a media storage system that communicates media information to a mobile communication device, in accordance with various aspects of the present invention.

FIG. 6 is a block diagram of a media storage system 600 that communicates media information to a mobile communication device, in accordance with various aspects of the present invention. The exemplary media storage system 600 may, for example and without limitation, share various functional characteristics with the exemplary method illustrated in FIG. 5 and discussed previously. Also, the exemplary media storage system 600 may, for example and without limitation, perform functionality that is compatible with the exemplary methods 100, 200 and the exemplary mobile communication device 300 and cellular phone 400 illustrated in FIGS. 1-4 and discussed previously.

The media storage system 600 (e.g., a personal media recorder or networked media storage system or server) may comprise a communication interface module 610 that communicates information (e.g., media information and control information) with other systems. The communication interface module may, for example, comprise a standard media communication interface module 612 that communicates media information with other systems (e.g., various head-end systems and/or standard media presentation systems that may be coupled to the media storage device).

The communication interface module 610 may, for example, comprise a mobile communication device communication interface module 614 that communicates media information or media control information with a mobile communication device. Such information may be communicated with the mobile communication device through any of a variety of communication links. In a non-limiting exemplary scenario, the mobile communication device comm. I/F module 614 may communicate media information or media control information with a mobile communication device through a cellular telephone network and/or computer communication network. The mobile communication device comm. I/F module 614 may also receive information (e.g., control information) from a mobile communication device that is receiving media information from the media storage system 600. In general, the communication interface module 610 may comprise any of a variety of communication modules, including without limitation, communication interface modules compatible with the communication interface modules 410 of the exemplary mobile communication device 400 illustrated in FIG. 4 and discussed previously.

The communication interface module 610 may also, for example, comprise a general communication interface module 616 that communicates general communication information (e.g., cellular phone information, message information, email information, etc.) with a mobile communication device. As mentioned in previous exemplary scenarios, a media information source might communicate media information and general communication information with a mobile communication device. The general communication interface module 616 may provide for such communication.

The media storage system 600 may comprise a communication control module 620 that manages communication of information (e.g., media information, control signals or general information) with the media storage system 600. The communication control module 620 may, for example, comprise a standard media communication control module 622 that manages standard communication of media information with the media storage system 600. Such communication may, for example, occur with a media information network head-end or with a standard media presentation device coupled to the media storage system 600.

The communication control module 620 may, for example, comprise a mobile communication device media communication control module 624. Such a module 624 may, for example, manage the communication of media information with a mobile communication device (e.g., through the mobile communication device comm. I/F module 714). For example, such a module 624 may retrieve media information from the media buffer 640 and communicate such media information to a mobile communication device. Also for example, such a module 624 may receive control information from the mobile communication device (e.g., through the mobile communication device comm. I/F sub-module 614) and utilize such control information to control a manner in which media information is communicated to the mobile communication device.

The media storage system 600 may, in various exemplary systems, also comprise a user interface module 630, which provides a user interface with the media storage system 600. The user interface module 630 may, for example and without limitation, share various characteristics with the user interface modules discussed previously herein (e.g., with respect to the mobile communication device 300 and the cellular phone 400) and with any general user interface module. The scope of various aspects of the present invention should not be limited by characteristics of any particular user interface modules or features.

The previous exemplary illustrations were generally directed to media receiving, processing, storing and presenting. As mentioned previously, and as stressed again here, such media may comprise characteristics of any of a variety of media types, including without limitation, multi-media, video, audio, textual, graphical, pictorial, and other known types of media information. Accordingly, the scope of various aspects of the present invention should not be limited by characteristics of any particular type of media information, or any particular methods and components for controlling, processing and presenting such information.

In summary, various aspects of the present invention provide a system and method for presenting media information to a user of a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a mobile communication device, a method for presenting media information to a user, the method comprising:
   receiving, at the mobile communication device, a first portion of a unit of media information from a remote media information source;
   presenting, at the mobile communication device, the first portion of the unit of media information;
   after presenting the first portion of the unit of media information, receiving a signal at the mobile communication device, wherein the received signal is unrelated to presentation of the media information;
   in response to the received signal, transmitting a control signal from the mobile communication device to the remote media information source over a dedicated reverse communication channel, where the control signal is configured to cause the remote media information source to stop transmitting the unit of media information to the mobile communication device;
   in conjunction with transmitting the control signal, stopping presentation of the media unit at a stopping point at a time before the remote media information source has stopped transmitting the unit of media information to the mobile communication device;
   receiving a second signal at the mobile communication device;
   in response to the received second signal, transmitting a second control signal from the mobile communication device to the remote media information source, wherein the second control signal is configured to cause the remote media information source to resume transmitting the unit of media information to the mobile communication device;
   receiving, at the mobile communication device, a second portion of the unit of media information from the remote media information source, the second portion of the unit of media information sequentially adjacent to the first portion of the unit of media information in the unit of media information;
   presenting, at the mobile communication device, the second portion of the unit of media information; and
   presenting an indication of how far the media information currently being presented lags a corresponding real-time transmission.

2. The method of claim 1, wherein receiving a signal comprises receiving a signal representative of a user input to the mobile communication device.

3. The method of claim 2, wherein the user input comprises an indication that an incoming phone call is to be serviced.

4. The method of claim 1, wherein the receiving of the signal comprises receiving the signal from a communication system external to the mobile communication device.

5. The method of claim 4, wherein the signal is indicative of an incoming phone call.

6. The method of claim 1, comprising, prior to the remote media information source stopping transmission of the unit of media information in response to the control signal:
   stopping presentation of the first portion of the unit of media information, and
   buffering a portion of the unit of media information received from the remote media information source after said presentation is stopped.

7. The method of claim 1, wherein the second control signal comprises information indicative of a particular point in the unit of media information.

8. The method of claim 1, comprising:
receiving a third signal, at the mobile communication device; and
in response to the received third signal:
transmitting a third control signal from the mobile communication device to the remote media information source, where the third control signal is configured to cause the remote media information source to transmit the unit of media information to the mobile communication device in a sequentially forward manner at a faster rate than normal;
receiving, at the mobile communication device, a third portion of the unit of media information from the remote media information source; and
presenting, at the mobile communication device, the third portion of the unit of media information in a sequentially forward manner at a faster rate than normal.

9. The method of claim 1, comprising:
receiving a third signal at the mobile communication device; and
in response to the received third signal:
transmitting a third control signal from the mobile communication device to the remote media information source, where the third control signal is configured to cause the remote media information source to transmit the unit of media information to the mobile communication device in a sequentially reversed manner;
receiving, at the mobile communication device, a third portion of the unit of media information from the remote media information source; and
presenting, at the mobile communication device, the third portion of the unit of media information in a sequentially reversed manner.

10. In a mobile communication device, a method for presenting media information, the method comprising:
performing a first communication between the mobile communication device and a remote media information source, wherein performing the first communication comprises receiving a first portion of a unit of media information from the remote media information source, and presenting the first portion of the unit of media information;
after presenting the first portion of the unit of media information:
stopping the first communication, wherein stopping the first communication comprises communicating a control signal from the mobile communication device to the remote media information source over a reverse communication channel shared between multiple mobile communication devices, and wherein the control signal is configured to cause the remote media information source to stop the first communication;
substantially immediately stopping presentation of the unit of media information at a stopping point, even if the remote media information source continues transmission of the media unit to the mobile communication device beyond the presentation stopping point;
performing a second communication;
after completing the second communication, resuming the first communication between the mobile communication device and the remote media information source, wherein resuming the first communication comprises receiving a second portion of the unit of media information from the remote media information source beginning at or near the stopping point and presenting the second portion of the unit of media information; and presenting an indication of how far the media information currently being presented lags a corresponding real-time transmission.

11. The method of claim 10, wherein resuming the first communication further comprises communicating a control signal from the mobile communication device to the remote media information source, and wherein the control signal is configured to cause the remote media information source to resume the first communication at or near the point where the first communication stopped.

12. The method of claim 10, further comprising, prior to performing the second communication, receiving a signal at the mobile communication device indicating that the mobile communication device is to perform the second communication.

13. The method of claim 10, comprising, prior to resuming the first communication, receiving a signal at the mobile communication device indicating that the mobile communication device is to resume presentation of the unit of media information at or near the point where the first communication stopped.

14. A mobile communication device comprising at least one module, wherein:
the at least one module is configured to receive a first portion of a unit of media information from a remote media information source;
the at least one module is configured to present the first portion of the unit of media information;
the at least one module is configured to receive a signal after the first portion of the unit of media information is presented, wherein the received signal is unrelated to presentation of the media information;
the at least one module is configured to, in response to the received signal, transmit a control signal to the remote media information source over a dedicated reverse communication channel, where the control signal is configured to cause the remote media information source to stop transmitting the unit of media information to the mobile communication device;
the at least one module is configured to, in conjunction with transmitting the control signal, stop presentation of the media unit at a stopping point at a time before the remote media information source has stopped transmitting the unit of media information to the mobile communication device;
the at least one module is configured to receive a second signal;
the at least one module is configured to, in response to the received second signal, transmit a second control signal to the remote media information source, wherein the second control signal is configured to cause the remote media information source to resume transmitting the unit of media information to the mobile communication device beginning at or near the stopping point;
the at least one module is configured to resume presentation of the media unit at a point corresponding to the stopping point by media information received from the remote media information source after resuming transmission; and
the at least one module further configured to present an indication of how far the media information currently being presented lags a corresponding real-time transmission.

15. The mobile communication device of claim 14, wherein the signal is representative of a user input to the mobile communication device.

16. The mobile communication device of claim 15, wherein the user input comprises an indication an incoming phone call is to be serviced.

17. The mobile communication device of claim 14, wherein the signal is received from a communication system external to the mobile communication device.

18. The mobile communication device of claim 17, wherein the signal is indicative of an incoming phone call.

19. The mobile communication device of claim 14, wherein the at least one module is configured to, prior to the remote media information source stopping transmission of the unit of media information in response to the control signal:
buffer a portion of the unit of media information received from the remote media information source after said presentation is stopped.

20. The mobile communication device of claim 14, wherein:
the at least one module is configured to, in response to the received second signal:
receive a second portion of the unit of media information from the remote media information source, the second portion of the unit of media information sequentially adjacent to the first portion of the unit of media information in the unit of media information; and
present the second portion of the unit of media information.

21. The mobile communication device of claim 20, wherein the second control signal comprises information indicative of a particular point in the unit of media information.

22. The mobile communication device of claim 20, wherein:
the at least one module is configured to receive a third signal; and
the at least one module is adapted to, in response to the received third signal:
transmit a third control signal to the remote media information source, where the third control signal is configured to cause the remote media information source to transmit the unit of media information to the mobile communication device in a sequentially forward manner at a faster rate than normal;
receive a third portion of the unit of media information from the remote media information source; and
present the third portion of the unit of media information in a sequentially forward manner at a faster rate than normal.

23. The mobile communication device of claim 20, wherein:
the at least one module is configured to receive a third signal; and
the at least one module is adapted to:
transmit a third control signal to the remote media information source, where the third control signal is configured to cause the remote media information source to transmit the unit of media information to the mobile communication device in a sequentially reversed manner;
receive a third portion of the unit of media information from the remote media information source; and
present the third portion of the unit of media information in a sequentially reversed manner.

24. The mobile communication device of claim 20, wherein the at least one module is configured to receive said first signal, said second signal and said first portion of a unit of information from the same communication system.

25. The mobile communication device of claim 20, wherein the second control signal comprises information identifying the unit of media information and information identifying a particular point in the unit of media information at which presentation is to resume.

26. The mobile communication device of claim 14, wherein the at least one module is configured to receive said signal and said first portion of a unit of information from the same communication system.

27. The mobile communication device of claim 14, wherein the at least one module is configured to present the user with options concerning how to resume presentation of the unit of media information.

28. A mobile communication device comprising at least one module, wherein:
the at least one module is configured to perform a first communication with a remote media information source, wherein performing the first communication comprises receiving a first portion of a unit of media information from the remote media information source, and presenting the first portion of the unit of media information;
the at least one module is configured to, after the first portion of the unit of media information is presented:
stop the first communication, wherein stopping the first communication comprises communicating a control signal from the mobile communication device to the remote media information source over a reverse communication channel shared between multiple mobile communication devices, and wherein the control signal is configured to cause the remote media information source to stop the first communication;
substantially immediately stop presentation of the unit of media information at a stopping point, even if the remote media information source continues transmission of the media unit to the mobile communication device beyond the stopping point;
perform a second communication; and
the at least one module is configured to, after the second communication is completed, resume the first communication between the mobile communication device and the remote media information source, wherein resuming the first communication comprises receiving a second portion of the unit of media information from the remote media information source beginning at or near the stopping point and presenting the second portion of the unit of media information, wherein the at least one module is further configured to present an indication of how far the media information currently being presented lags a corresponding real-time transmission.

29. The mobile communication device of claim 28, wherein the at least one module is configured to resume the first communication by, at least in part, communicating a control signal to the remote media information source, and wherein the control signal is adapted to cause the remote media information source to resume the first communication at or near the point where the first communication stopped.

30. The mobile communication device of claim 28, wherein the at least one module is configured to, prior to performing the second communication, receive a signal from the user indicating that the mobile communication device is to perform the second communication.

31. The mobile communication device of claim 28, wherein the at least one module is configured to, prior to resuming the first communication, receive a signal from the user indicating that the mobile communication device is to resume presentation of the unit of media information at or near the point where the first communication stopped.

* * * * *